United States Patent
Thibaut et al.

(10) Patent No.: US 11,768,534 B2
(45) Date of Patent: Sep. 26, 2023

(54) METHOD AND POWER DISTRIBUTION CIRCUIT FOR PROVIDING ELECTRIC POWER FROM A PLURALITY OF POWER SUPPLIES TO A PLURALITY OF LOADS

(71) Applicant: OVH, Roubaix (FR)

(72) Inventors: Christophe Maurice Thibaut, Noyelles les Seclin (FR); Patrick-Gilles Maillot, Marsanne (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 17/677,217

(22) Filed: Feb. 22, 2022

(65) Prior Publication Data
US 2022/0276692 A1 Sep. 1, 2022

(30) Foreign Application Priority Data
Feb. 26, 2021 (EP) .................................... 21305240

(51) Int. Cl.
*G06F 1/32* (2019.01)
*G06F 1/329* (2019.01)
(Continued)

(52) U.S. Cl.
CPC ............ *G06F 1/329* (2013.01); *G06F 1/3206* (2013.01); *G06F 1/3287* (2013.01); *G06F 1/3296* (2013.01)

(58) Field of Classification Search
None
See application file for complete search history.

(56) References Cited

U.S. PATENT DOCUMENTS

| 6,121,693 A | * | 9/2000 | Rock ......................... H02J 1/14 |
| | | | 307/18 |
| 6,948,021 B2 | | 9/2005 | Derrico et al. |

(Continued)

FOREIGN PATENT DOCUMENTS

| CN | 205544570 U | 8/2016 |
| CN | 106502363 A | 3/2017 |

(Continued)

OTHER PUBLICATIONS

Extended European Search Report with regard to the counterpart EP Patent Application No. 21305240.0 completed Aug. 3, 2021.

(Continued)

*Primary Examiner* — Jaweed A Abbaszadeh
*Assistant Examiner* — Cheri L Harrington
(74) *Attorney, Agent, or Firm* — BCF LLP

(57) ABSTRACT

A power distribution circuit for providing electric power from a plurality of power supplies to a plurality of loads comprises a combiner of power outputs of the power supplies to provide power at a given voltage to a plurality of hot swap modules that are each electrically connected to the combiner and to a power input of a corresponding load. Each hot swap module verifies one or more conditions selected from the given voltage being at least equal to a minimum voltage threshold, the given voltage not exceeding a maximum voltage threshold, and a current consumed by the load not exceeding a maximum current threshold. Each hot swap module delivers power to the power input of the corresponding load when all selected conditions are met and isolates the power input of the corresponding load from the power supplies when any one of the selected conditions is not met.

13 Claims, 11 Drawing Sheets

(51) Int. Cl.
*G06F 1/3206* (2019.01)
*G06F 1/3287* (2019.01)
*G06F 1/3296* (2019.01)

(56) References Cited

U.S. PATENT DOCUMENTS

| | | | |
|---|---|---|---|
| 7,030,771 B2 | 4/2006 | Kinnard et al. | |
| 7,093,048 B2* | 8/2006 | Bobbitt | G06F 1/26 710/302 |
| 7,127,542 B2 | 10/2006 | Parameswaran | |
| 7,624,303 B2 | 11/2009 | Burkland et al. | |
| 7,831,860 B2 | 11/2010 | Hsieh et al. | |
| 9,152,197 B2 | 10/2015 | Liu | |
| 9,755,454 B1 | 9/2017 | Reynov et al. | |
| 10,228,741 B2 | 3/2019 | Wang et al. | |
| 10,516,260 B2 | 12/2019 | Bemat et al. | |
| 2004/0032716 A1 | 2/2004 | Roan | |
| 2006/0082222 A1* | 4/2006 | Pincu | G06F 1/3203 307/29 |
| 2011/0019352 A1* | 1/2011 | Kwon | G06F 1/181 361/679.02 |
| 2014/0368179 A1* | 12/2014 | Lee | H02J 9/005 323/304 |
| 2018/0088656 A1* | 3/2018 | Arduini | G06F 1/3287 |
| 2020/0335961 A1 | 10/2020 | Huang et al. | |

FOREIGN PATENT DOCUMENTS

| | | |
|---|---|---|
| CN | 104680087 B | 2/2018 |
| CN | 109327020 A | 2/2019 |
| CN | 110377138 A | 10/2019 |
| CN | 111949592 A | 11/2020 |
| WO | 2014171904 A2 | 10/2014 |
| WO | 2014171904 A3 | 12/2014 |

OTHER PUBLICATIONS

Linear Technology, "LTC4232 5A Integrated Hot Swap Controller", https://www.analog.com/en/products/ltc4232.html#/product-overview access Jan. 14, 2021, pdf 16 pages.
English Abstract for CN 109327020 retrieved on Espacenet on Feb. 15, 2022.
English Abstract for CN104680087 retrieved on Espacenet on Feb. 15, 2022.
English Abstract for CN110377138 retrieved on Espacenet on Feb. 15, 2022.
English Abstract for CN106502363 retrieved on Espacenet on Feb. 15, 2022.
English Abstract for CN205544570 retrieved on Espacenet on Feb. 15, 2022.
English Abstract for CN111949592 retrieved on Espacenet on Feb. 15, 2022.

* cited by examiner

METHOD AND POWER DISTRIBUTION CIRCUIT FOR PROVIDING ELECTRIC POWER FROM A PLURALITY OF POWER SUPPLIES TO A PLURALITY OF LOADS

CROSS REFERENCE

The present application claims priority from European Patent Application No. EP21305240.0, filed on Feb. 26, 2021, the entirety of which is incorporated by reference herein.

FIELD

The present technology relates to power distribution circuits and methods. In particular, the circuits and methods are used for providing electric power from a plurality of power supplies to a plurality of loads.

BACKGROUND

Today's data centers and processing centers, such as those used in blockchain technology, contain very large numbers of servers, for example thousands or tens of thousands of servers. Data centers also contain electric loads of various types, for example capacitors, fans, hard disc drives, and the like, these loads being present in large numbers. All these loads consume important amounts of electric power, mainly DC power, at various voltages.

In particular, many servers comply with Advanced Technology eXtended (ATX) specifications and require power to be provided at 12V, 5V, 3.3V and further require standby power to be provided at 5V (5V_sb). Usually, one ATX power supply is used to provide all these voltages for one server. When the ATX power supply initially receives electric power from a power supply, for example from an uninterruptible power supply (UPS), the ATX power supply initially supplies the 5V_sb power to the server, allowing booting of the server. When all other voltages reach a level close to their nominal values, for example 95% of their nominal values, the ATX power supply emits a 'power good' signal, also called 'PWR_OK' signal, the signal being received at the server a brief delay, for example 150 milliseconds, after its complete connection. The server may then start using power at 12V, 5V and 3.3V.

The relation between the availability of power at the specific voltages and the issuance of the power good signal is such that it is conventional to install one ATX power supply for each server. Such a 1:1 configuration between ATX power supplies and servers is commonly used and simple. This configuration brings the disadvantage that the power delivery capabilities of the ATX power supplies are not exploited efficiently. ATX power supplies are designed to be able to withstand the maximum power requirements of the servers that they are connected to. However, the actual load of tasks assigned to many servers varies with time so many servers spend a large portion of the time using much less than their maximum power requirements. In contrast, one advantage of the 1:1 configuration between ATX power supplies and servers is that failure of one ATX power supply only brings the loss of one server and that, conversely, failure of one server only brings the loss of one ATX power supply.

Other loads may require the provision of DC power at various voltages that may or may not be the same as those defined in ATX specifications. The above described advantages and disadvantages of the 1:1 configuration between power supplies and loads are similar. The 1:1 configuration allows to isolate failures of a power supply and/or its connected load from other power supply/load combinations. The 1:1 configuration may prevent to fully utilize the power delivery capabilities of the power supplies. Should a 1:N configuration be used, for example using one power supply to provide power to N fans, a fault of the power supply could lead to the loss of N fans and a fault of one of the fans (for example a short-circuit) could lead to the loss of the power supply and of the other fans.

In a large data center containing thousands or tens of thousands of serves and many other electric components, day-to-day operations involve installation and/or replacement of many loads, as requirements for processing capabilities increase with time and as faulty or outdated equipment need to be replaced. Replacement or addition of components must be performed while other components of the data center, including equipment contained in a same rack of the data center, remain powered and active. Hot plugging or hot swapping or equipment requires the use of specialized circuitry, called hot swap controllers, designed to allow plugging of equipment to live power supplies. The role of such circuitry is to prevent sparking due to electrostatic discharge when a component is plugged to or unplugged from a live power source. The particularities of the ATX power supplies, which provide power good signals to connected servers, are such that hot plugging of the servers is possible without the need to resort of external hot swap controllers.

Despite the above-described technological advancements, there is still no known solution allowing to combine a number of power supplies to provide power to a number of loads while preventing failure of one of the power supplies or failure of one of the loads from cascading to the remainder of the power supplies and of the loads.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) under-use of the power delivery capabilities of power supplies; and/or (2) eventual loss of plural loads if connected to a same power supply.

In one aspect, various implementations of the present technology provide a method for providing electric power from a plurality of power supplies to a plurality of loads, the method comprising: combining power outputs of the plurality of power supplies to provide power at a first voltage; delivering power at the first voltage to a plurality of first hot swap modules, each first hot swap module being electrically connected to a first power input of a corresponding one of the plurality of loads; and at each first hot swap module: verifying one or more first conditions selected from the first voltage being at least equal to a first minimum voltage threshold, the first voltage not exceeding a first maximum voltage threshold, and a current consumed by the load at the first voltage not exceeding a first maximum current threshold, selectively delivering power at the first voltage to the first power input of the corresponding load in response to the one or more first conditions being met, and isolating the first power input of the corresponding load from the plurality of power supplies in response to any one of the one or more first conditions not being met.

In some implementations of the present technology, the method further comprises: delivering power at the first voltage to a first power converter to provide power at a second voltage; delivering power at the second voltage to a plurality of second hot swap modules, each second hot swap module being electrically connected to a second power input of a corresponding one of the plurality of loads; and at each second hot swap module: verifying one or more second conditions selected from the second voltage being at least equal to a second minimum voltage threshold, the second voltage not exceeding a second maximum voltage threshold, and a current consumed by the load at the second voltage not exceeding a second maximum current threshold, selectively delivering power at the second voltage to the second power input of the corresponding load in response to the one or more second conditions being met, and isolating the second power input of the corresponding load from the first power converter in response to any one of the one or more second conditions not being met.

In some implementations of the present technology, the method further comprises: delivering power at the first voltage to a second power converter to provide power at a third voltage; delivering power at the third voltage to a plurality of third hot swap modules, each third hot swap module being electrically connected to a third power input of a corresponding one of the plurality of loads; and at each third hot swap module: verifying one or more third conditions selected from the third voltage being at least equal to a third minimum voltage threshold, the third voltage not exceeding a third maximum voltage threshold, and a current consumed by the load at the third voltage not exceeding a third maximum current threshold, selectively delivering power at the third voltage to the third power input of the corresponding load in response to the one or more third conditions being met, and isolating the third power input of the corresponding load from the second power converter in response to any one of the one or more third conditions not being met.

In some implementations of the present technology, the method further comprises: combining standby power outputs of the plurality of power supplies to provide standby power at a first standby voltage; delivering standby power at the first standby voltage to a third power converter to provide standby power at a second standby voltage; delivering standby power at the second standby voltage to a plurality of fourth hot swap modules, each fourth hot swap module being electrically connected to a standby power input of a corresponding one of the plurality of loads; and at each fourth hot swap module: verifying one or more fourth conditions selected from the second standby voltage being at least equal to a minimum standby voltage threshold, the second standby voltage not exceeding a maximum standby voltage threshold, and a current consumed by the load at the second standby voltage not exceeding a maximum standby current threshold, selectively delivering standby power at the second standby voltage to the standby power input of the corresponding load in response to the one or more fourth conditions being met, and isolating the standby power input of the corresponding load from the third power converter in response to any one of the one or more fourth conditions not being met.

In another aspect, various implementations of the present technology provide a power distribution circuit for providing electric power from a plurality of power supplies to a plurality of loads, the circuit comprising: a first combiner of power outputs of the plurality of power supplies, the first combiner being adapted to provide power at a first voltage; and a plurality of first hot swap modules, each first hot swap module being electrically connected to the first combiner and to a first power input of a corresponding one of the plurality of loads, each first hot swap module being adapted to: verify one or more first conditions selected from the first voltage being at least equal to a first minimum voltage threshold, the first voltage not exceeding a first maximum voltage threshold, and a current consumed by the load at the first voltage not exceeding a first maximum current threshold, selectively deliver power at the first voltage to the first power input of the corresponding load in response to the one or more first conditions being met, and isolate the first power input of the corresponding load from the plurality of power supplies in response to any one of the one or more first conditions not being met.

In some implementations of the present technology, the circuit further comprises: a first power converter electrically connected to the first combiner and adapted to provide power at a second voltage; and a plurality of second hot swap modules, each second hot swap module being electrically connected to the first power convertor and to a second power input of a corresponding one of the plurality of loads, each second hot swap module being adapted to: verify one or more second conditions selected from the second voltage being at least equal to a second minimum voltage threshold, the second voltage not exceeding a second maximum voltage threshold, and a current consumed by the load at the second voltage not exceeding a second maximum current threshold, selectively deliver power at the second voltage to the second power input of the corresponding load in response to the one or more second conditions being met, and isolate the second power input of the corresponding load from the first power converter in response to any one of the one or more second conditions not being met.

In some implementations of the present technology, the circuit further comprises: a second power converter electrically connected to the first combiner and adapted to provide power at a third voltage; and a plurality of third hot swap modules, each third hot swap module being electrically connected to the second power convertor and to a third power input of a corresponding one of the plurality of loads, each third hot swap module being adapted to: verify one or more third conditions selected from the third voltage being at least equal to a third minimum voltage threshold, the third voltage not exceeding a third maximum voltage threshold, and a current consumed by the load at the third voltage not exceeding a third maximum current threshold, selectively deliver power at the third voltage to the third power input of the corresponding load in response to the one or more third conditions being met, and isolate the third power input of the corresponding load from the second power converter in response to any one of the one or more third conditions not being met.

In some implementations of the present technology, the circuit further comprises: a plurality of third power converters, each third power converter being electrically connected to a standby power output of a corresponding power supply for receiving power at a first standby voltage, each third power converter being adapted to provide standby power at a second standby voltage; a second combiner electrically connected to the plurality of third power converters, the second combiner being adapted to combine the standby power at the second standby voltage; and a plurality of fourth hot swap modules, each fourth hot swap module being electrically connected to the second combiner and to a standby power input of a corresponding one of the plurality of loads, each fourth hot swap module being adapted to: verify one or more fourth conditions selected from the second standby voltage being at least equal to a minimum standby voltage threshold, the second standby voltage not exceeding a maximum standby voltage threshold, and a current consumed by the load at the second standby voltage not exceeding a maximum standby current threshold, selectively deliver standby power at the second standby voltage to the standby power input of the corresponding load in response to the one or more fourth conditions being met, and isolate the standby power input of the corresponding load from the third power converter in response to any one of the one or more fourth conditions not being met.

In some implementations of the present technology, each load comprises a respective first power input, a respective second power input, a respective third power input and a respective standby power input.

In some implementations of the present technology, each second hot swap module is adapted to generate a first power good signal in response to the second voltage being available at the second hot swap module; each third hot swap module is adapted to generate a second power good signal in response to the third voltage being available at the third hot swap module; and the circuit further comprises a plurality of logic gates, each logic gate being adapted to: combine the first power good signal generated by a given second hot swap module electrically connected to the second power input of a given load with the second power good signal generated by a given third hot swap module electrically connected to the third power input of the given load, and deliver the combined power good signal to the given load.

In some implementations of the present technology, each load is a server; and the first voltage, the second voltage, the third voltage and the second standby voltage comply with an ATX specification.

In some implementations of the present technology, the circuit further comprises: a controller operatively connected to the plurality of power supplies and adapted to: monitor a power level provided by the plurality of power supplies; and selectively activate and deactivate one or more of the plurality of power supplies to maintain active all or a subset of the plurality of power supplies sufficient to respond to power demands of the plurality of loads.

In some implementations of the present technology, a number of the plurality of loads is greater than a number of the plurality of power supplies.

In some implementations of the present technology, the number of the plurality of loads is selected as a function of the number of the plurality of power supplies for power supply redundancy.

In some implementations of the present technology, the plurality of loads comprises a first subset of loads of a first type and a second subset of loads of a second type; power is selectively delivered to the loads of the first subset at the first voltage; and power is selectively delivered to the loads of the second subset at the second voltage.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
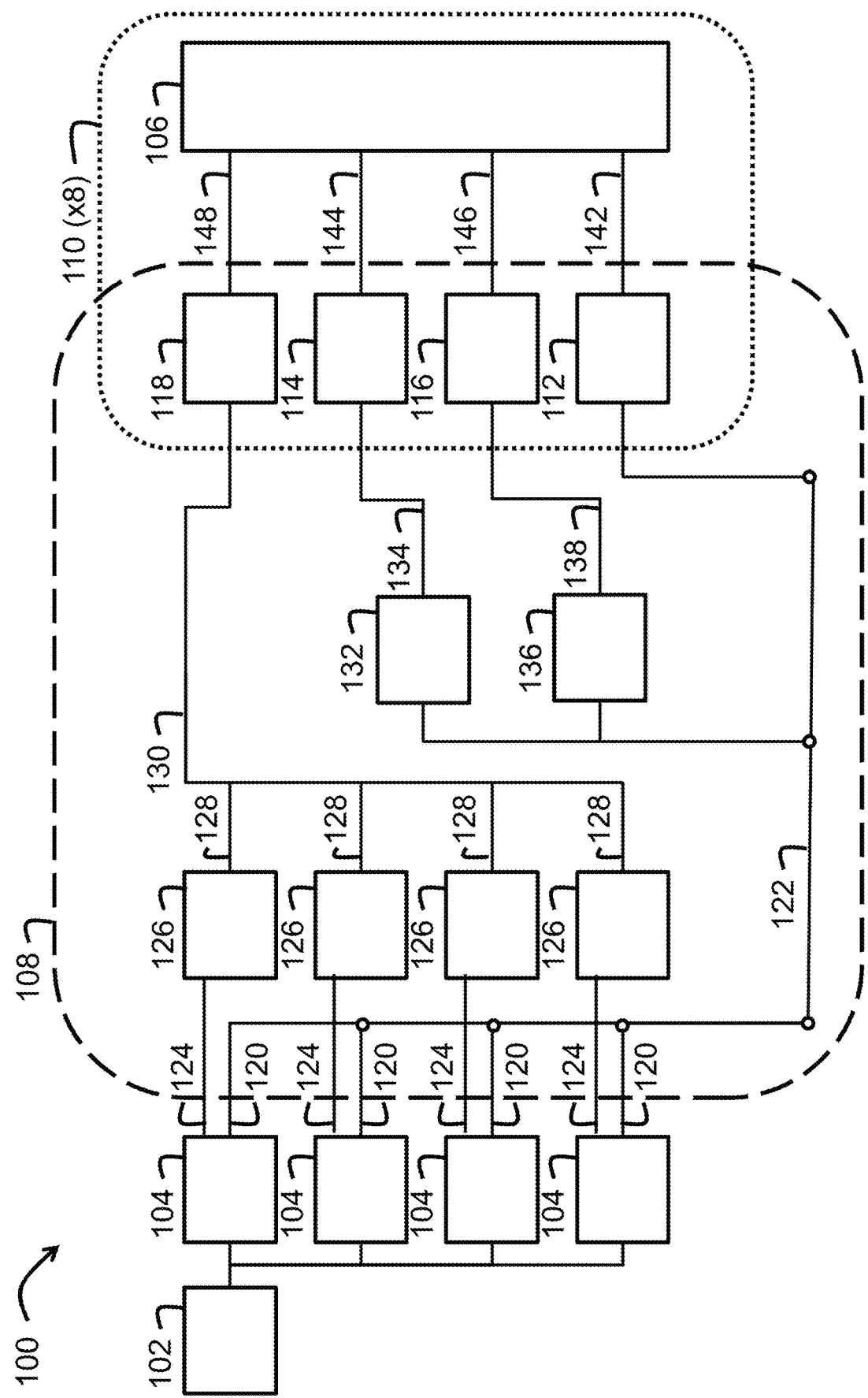
FIG. 1 illustrates a power distribution arrangement in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology, a method and a circuit allow to provide electric power from a plurality of power supplies to a plurality of electric loads (all mentions of loads herein refer to electric loads). Power outputs of the plurality of power supplies are combined to provide power at a first voltage. Power is delivered at the first voltage to a plurality of first hot swap modules (HSM). Each HSM is electrically connected to a first power input of a corresponding one of the plurality of loads. Each HSM may selectively deliver power at the first voltage to the first power input of the corresponding load. Each HSM may alternatively isolate the first power input of the corresponding load from the plurality of power supplies. Power is delivered when no fault condition is detected by the HSM, fault conditions including overvoltage, undervoltage, or overcurrent detected by the HSM.

Embodiments may comprise delivering power to the loads at a plurality of voltages. To this end, the power at the first voltage may be applied to power converters to provide power at one or more additional voltages. Power at each of the additional voltages is delivered to HSMs that are electrically connected to power inputs of corresponding ones of the plurality of loads. These HSMs also operate to selectively deliver the power at to these power inputs on the condition that no overvoltage, undervoltage, or overcurrent fault is detected.

The present technology allows to provide power from a first number of power supplies to a second number of loads while preventing a fault occurring on any one of the loads from causing a failure of any one of the power supplies and while preventing a fault occurring on any one of the power supplies from causing a failure of any one of the loads. At the same time, power efficiency is improved by the capability to distribute power from the first number of power supplies to the second number of loads, including when the second number of loads is greater than the first number of power supplies.

With these fundamentals in place, we will now consider some non-limiting examples to illustrate various implementations of aspects of the present technology.

FIG. 1 illustrates a power distribution arrangement 100. The power distribution arrangement 100 comprises an AC power supply 102, a plurality of power supplies, for example AC/DC power converters 104, a plurality of loads 106, for example servers 370 (introduced in FIG. 3), and a power distribution circuit 108. The power distribution circuit 108 includes a plurality of components contained in an area defined by a dashed line in FIG. 1. A combination 110 contains a load 106 (e.g. one server, or one or more other electric devices, such as hard disc drives, fans, etc.) and hot swap modules (HSM) 112, 114, 116 and 118. There are plural instances of the combination 110. For example and without limitation, there may be four AC/DC power converters 104 arranged to provide power to eight servers 370, which are part of eight combinations 110, each combination 110 also including respective HSMs 112, 114, 116 and 118. It is contemplated that other numbers of AC/DC power converters 104 may be arranged to provide power to other numbers of servers and/or to other types of loads 106. In non-limiting embodiments, a number of the servers may be greater than a number of the AC/DC power converters 104.

In the illustrated power distribution arrangement 100, the AC/DC power converters 104 receive AC power, for example at 110V or 220V, directly from a sector or via an uninterruptible power supply (not shown), and provide DC power at a first voltage, for example 12V, on respective power outputs 120. The DC power provided by the AC/DC power converters 104 is combined by connecting the power outputs 120 to a 12V bus 122 that acts as a combiner for the DC power. Use of a group of connected wires and use of an active component for combining the DC power provided by the AC/DC power converters 104 are also contemplated. Each AC/DC power converters 104 also provides standby power at a first standby voltage, for example 12V (12V_sb), on standby power outputs 124. The 12V_sb power is applied to four respective DC/DC power converters 126 that output standby power at a second standby voltage, for example 5V (5V_sb). The 5V_sb standby power provided by the DC/DC power converters 126 is combined by connecting power outputs 128 of the DC/DC power converters 126 to a 5V_sb bus 130 that acts as a combiner for the standby DC power. Use of a group of connected wires and use of an active component for combining the 5V_sb standby power provided by the DC/DC power converters 126 are also contemplated. It is further contemplated that the standby DC power provided by the AC/DC power converters 104 could be combined by connecting the standby power outputs 124 to a 12V_sb bus (not shown) acting as a combiner for the standby DC power, the 12V_sb bus being connected to a single DC/DC power converter 126 providing the 5V_sb standby power at its power output 128 to the 5V_sb bus 130.

The 12V bus 122 is connected to the HSM 112 of each combination 110 for providing 12V DC power to a first power input 142 of a respective load 106 (e.g. one server 370). The 12V bus 122 is also connected to a DC/DC power converter 132 having an output 134 for providing DC power at a second voltage, for example 5V, to a second power input 144 of a respective load 106 (e.g. the server 370) via the respective HSM 114. The 12V bus 122 is further connected to another DC/DC power converter 136 having an output 138 for providing DC power at a third voltage, for example 3.3V, to a third power input 146 of a respective load 106 (e.g. the server 370) via the respective HSM 116. The 5V_sb bus 130 is connected to the HSM 118 of each combination 110 for providing 5V_sb standby power to a standby power input 148 of a respective load 106 (e.g. the server 370). Any one of the DC/DC power converters 132 and 136 may comprise multiple DC/DC power converters operating in parallel, should the power delivery capabilities of these converters be insufficient for powering, at their respective voltages, all of the loads 106 included in the power distribution arrangement 100.

Each HSM 112, 114, 116 and 118 is constructed to selectively deliver power at voltage applied thereon to a corresponding power input 142, 144, 146 or 148 of the respective load 106, the power being delivered when no fault condition is detected by the HSM 112, 114, 116 or 118. If a fault is detected by a given HSM 112, 114, 116 or 118, the HSM isolates the corresponding power input 142, 144, 146 or 148 of the respective load 106 from other components of the power distribution arrangement 100, ultimately isolating the corresponding power input 142, 144, 146 or 148 of the respective load 106 from the AC/DC power converters 104. Examples of fault conditions that may be detected by the HSMs 112, 114, 116 and 118 include overvoltage, undervoltage and overcurrent. Some of the HSMs 112, 114, 116 and 118 may implement various combinations of these fault conditions.

Figure 2:
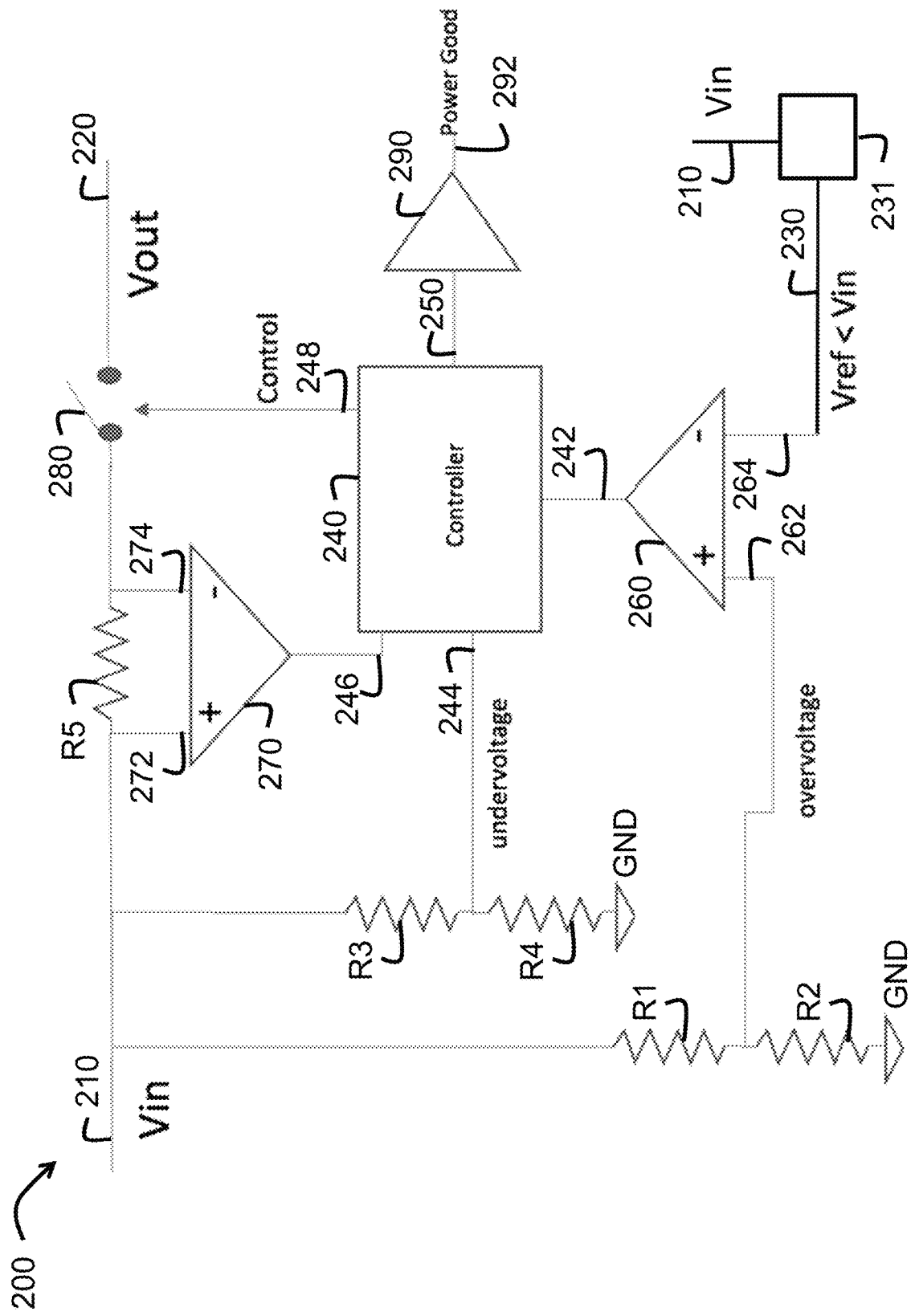
FIG. 2 shows an example of the construction of a generic hot swap module in accordance with an embodiment of the present technology.

FIG. 2 shows an example of the construction of a generic HSM 200. The generic HSM 200 that may be configured to operate as any one of the HSMs 112, 114, 116 or 118. The HSM 200 comprises a power input 210, a power output 220, a reference voltage input 230 connected to a DC/DC converter 231, a controller 240, comparators 260 and 270, a switch 280, a first voltage divider comprising resistances R1 and R2 connected to ground (GND), a second voltage divider comprising resistances R3 and R4 connected to ground, a sense resistor R5, and may comprise an amplifier buffer 290. The controller 240 has an overvoltage input 242 connected to the comparator 260, a voltage sense input 244 for sensing a voltage between the resistors R3 and R4, a current measurement input 246 connected to the comparator 270, a control output 248 for controlling the switch 280 and a power good output 250 connected to the amplifier buffer 290. It may be noted that the amplifier buffer 290 may not be present in some of the HSMs of FIG. 1.

The comparator 260 has a positive input 262 for sensing a voltage between the resistors R1 and R2 and a negative input 262 receiving a reference voltage Vref from the reference voltage input 230. The comparator 270 has a positive input 272 and a negative input 274 connected to both sides of the sense resistor R5, the positive input 272 sensing an input voltage Vin at the power input 210 and the negative input sensing an output voltage Vout at the power output 220 when the switch 280 is closed. The amplifier buffer 290 has an output 292 to transmit a power good signal received from the power good output 250 of the controller 240 when the output voltage Vout at the power output 220 has been available at close to its nominal voltage, for example at 95% of its nominal voltage, for at least a minimum time duration, for example 800 milliseconds.

The voltage Vin may nominally be the value of any one of the voltages mentioned in the description of FIG. 1, i.e. 12V for the HSM 112, 5V for the HSMs 114 and 118, and 3.3V for the HSM 116. Under normal operating conditions, the controller 240 closes the switch 280 to allow power to flow between the power input 210 and the power output 220. A value of the sense resistor R5 is very small, for example and without limitation 0.001 ohm, so that the output voltage Vout is for all practical purposes equal to the input voltage Vin for normal values of current flowing through the HSM 200.

The controller 240 may cause opening of the switch 280 to isolate the power output 220 and any load 106 connected to the power output (e.g. a power input of a respective server 370) from the power input 210 and any source of power connected thereto (e.g. the AC/DC power converters 104 or one of the DC/DC power converters 126, 132 or 136). The controller 240 may cause opening of the switch 280 in response to any one of an overvoltage condition, an undervoltage condition, or an overcurrent condition. It should be noted that various embodiments of the HSM 200 (including various embodiments of the HSMs 112, 114, 116 and 118) may each be configured to detect one or both or all three of these fault conditions.

The controller 240 may detect an overvoltage condition, if present at the power input 210, in the following manner. A voltage between resistors R1 and R2 is a fraction of the voltage Vin, this fraction being determined by values of the resistors R1 and R2. This voltage is applied to the positive input 262 of the comparator 260. The reference voltage Vref is applied to the negative input 264 of the comparator 260. Vref is smaller than the expected value of Vin and is determined as a function of the expected value of Vin and as a function of the values of the resistors R1 and R2. The value Vref may for example be obtained by applying the voltage Vin from the power input 210 to the DC/DC converter 231. So long as Vref is significantly lower than Vin, the DC/DC converter 231 should provide a predictable value for Vref. For example and without limitation, if Vin should not exceed 14V and if the resistors R1 and R2 have equal values, Vref may be set to 7V and the voltage at the positive input 262 should not exceed 7V. As long as the voltage at the positive input 262 is less than Vref, the comparator 260 does not detect and report an overvoltage condition to the overvoltage input 242 of the controller 240. An excessive value of Vin is detected when the voltage applied to the positive input 262 exceeds the value of Vref. If this occurs, the comparator 260 reports an overvoltage condition of the controller 240 that, in turn, causes opening of the switch 280 via the control output 248. In a non-limiting embodiment, Vref and the values of the resistors R1 and R2 may be selected so that overvoltage is detected when Vin exceeds 110% or 105% of its nominal value for Vin. For example and without limitation, maximum voltage thresholds may be at 110% of 12V, 105% of 5V, and 105% of 3.3V for the various voltages in the power distribution arrangement 100.

The controller 240 may detect an undervoltage condition, if present at the power input 210, in the following manner. A voltage of between resistors R3 and R4 is a fraction of the voltage Vin, this fraction being determined by values of the resistors R3 and R4. This voltage is applied to the voltage sense input 244 of the controller 240. If the voltage applied to the voltage sense input 244 does not at least meet an internal minimum voltage threshold defined in the controller 240, Vin is lower than a minimum value and the controller 240 causes opening of the switch 280 via the control output 248. In a non-limiting embodiment, the internal minimum voltage threshold and the values of the resistors R3 and R4 may be selected so that undervoltage is detected when Vin is less than a threshold defined at 90% or 95% of a nominal value for Vin. For example and without limitation, minimum voltage thresholds may be at 90% of 12V, 95% of 5V, and 95% of 3.3V for the various voltages in the power distribution arrangement 100.

The controller 240 may detect an overcurrent condition, if present in the HSM 200, in the following manner. A voltage across the shunt resistor R5 is a direct function of a level of current flowing between the power input 210 and the power output 220 via the shunt resistor R5. This voltage is applied to the positive and negative inputs 272 and 274 of the comparator 270. The comparator 270 amplifies this voltage and provides a signal indicative of the level of current flowing through the shunt resistor R5. This signal is received at the current measurement input 246 of the controller 240. If the reported level of current exceeds an internal maximum current threshold defined in the controller 240, the controller 240 causes opening of the switch 280 via the control output 248. In a non-limiting embodiment, the maximum current thresholds for use with the server 370 may be set to 30 amperes at 12V, 2 amperes at 5V, 3 amperes at 3.3V, and 1 ampere for the 5V_sb standby power.

When none of the above-described overvoltage, undervoltage or overcurrent condition is detected, the controller 240 causes closing of the switch 280. In various embodiments, the switch 280 may be normally open or normally closed. As such, the controller 240 may either issue a signal on the control output 248 to cause closing a normally open switch when no fault is detected, or to cause opening a normally open switch in response to detecting a fault. It may be noted that different configurations may apply to any one of the HSMs 112, 114, 116 and 118. For example and without limitation, the HSM 118 may not implement the detection of an overvoltage of the 5V_sb power.

In at least some embodiments of the HSM 200, the controller 240 may issue a power good signal at the power good output 250. The controller 240 issues the power good signal when no fault condition is present and the switch 280 is allowed to close. In some embodiments, the controller 240 may issue the power good signal a brief delay after closing the switch 280. For example, the controller 240 may issue the power good signal 10 milliseconds after evaluating that Vin has reached at least 90% of its nominal value, this evaluating being made based on the voltage value detected at the voltage sense input 244. The amplifier buffer 290, if present, may provide an amplified version of the power good signal at its output 292.

Figure 3:
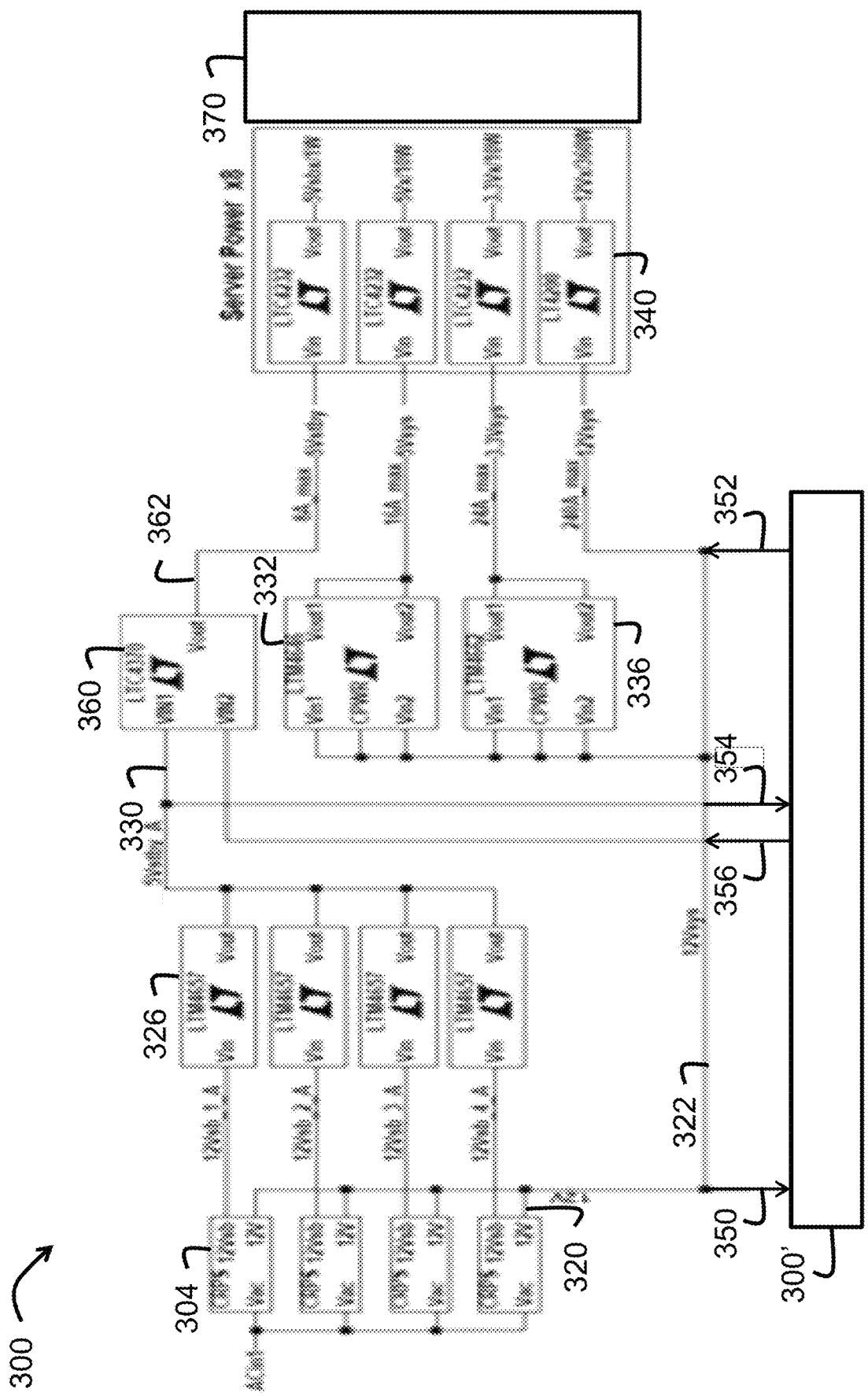
FIG. 3 illustrates a non-limiting embodiment of the power distribution arrangement of FIG. 1 in accordance with an embodiment of the present technology.

FIG. 3 illustrates a non-limiting embodiment of the power distribution arrangement of FIG. 1. In a particular power distribution arrangement 300, the AC/DC power converters 104 may be realised using common redundant power supplies (CRPS) 304. These power supplies are constructed so that the power outputs 320 of plural CRPSs 304 may be directly connected to one another. Four such CRPS 304 may be configured for outputting 12V DC power at sufficient level for powering up to eight servers. Current values (in amperes) and power values (in watts) shown on FIG. 3 are for illustration purposes and do not limit the generality of the present technology.

The DC/DC power converters 126 may be realised using LTM4657 step-down DC/DC regulators 326 from Analog Devices™ configured for receiving 12V DC power and outputting 5V DC power. The DC/DC power converter 132 may be realised using a LTM4646 switching mode DC/DC supply 332 from Analog Devices™ configured for receiving 12V DC power and outputting 5V DC power. The DC/DC power converter 136 may be realised using a LTM4662 switching mode DC/DC supply 336 from Analog Devices™ configured for receiving 12V DC power and outputting 3.3V DC power. The controller 240 of the HSM 200, which is a generic form of the HSMs 112, 114, 116 and 188 may be realised using a LTC4232 integrated hot swap controller module 340 from Analog Devices™. In each of a plurality of combinations 110 (see FIG. 1), the HSMs 112, 114, 116 and 118 respectively provide 12V, 5V, 3.3V and 5V_sb power to corresponding power inputs of an ATX-compliant server 370.

FIG. 3 shows that the power distribution arrangement 300 may be extended to cooperate with another similar arrangement 300' for load sharing and/or redundancy purposes. A 12V bus 322 may extend toward the other power distribution arrangement 300', as shown by an arrow 350, so that some 12V power may be distributed by the power distribution arrangement 300 to the other power distribution arrangement 300'. Similarly, the other power distribution arrangement 300' may provide some 12V power to the power distribution arrangement 300, as shown by an arrow 352. Such redundancy of the power distribution arrangements 300 and 300' is also available for the 5V_sb power. A 5V_sb bus 330 extending from the converters 326 may extend toward the other power distribution arrangement 300', as shown by an arrow 354. Similarly, the other power distribution arrangement 300' may provide some 5V_sb power to the power distribution arrangement 300, as shown by an arrow 356. A combiner 360, for example a LTC4370 current balancing controller from Analog Devices™, may be used to combine the 5V_sb power from the 5V_sb bus 330 and from the other power distribution arrangement 300' to form a combined 5V_sb bus 362 connected to the HSM operating at 5V_sb (HSM 118 in FIG. 1).

The various DC voltages mentioned in the description of FIGS. 1 and 3 are appropriate for powering the servers 370 according to the ATX specification. Embodiments generating other voltages for powering servers that do not comply to the ATX specification or for powering other electric components, such as for example capacitors, hard disc drives, or fans, are also contemplated. Particular embodiments may provide power at fewer or more than the four voltages mentioned in the description of FIGS. 1 and 3. For example and without limitation, some loads 106 or combination of loads 106 may not use any standby power.

Figure 4:
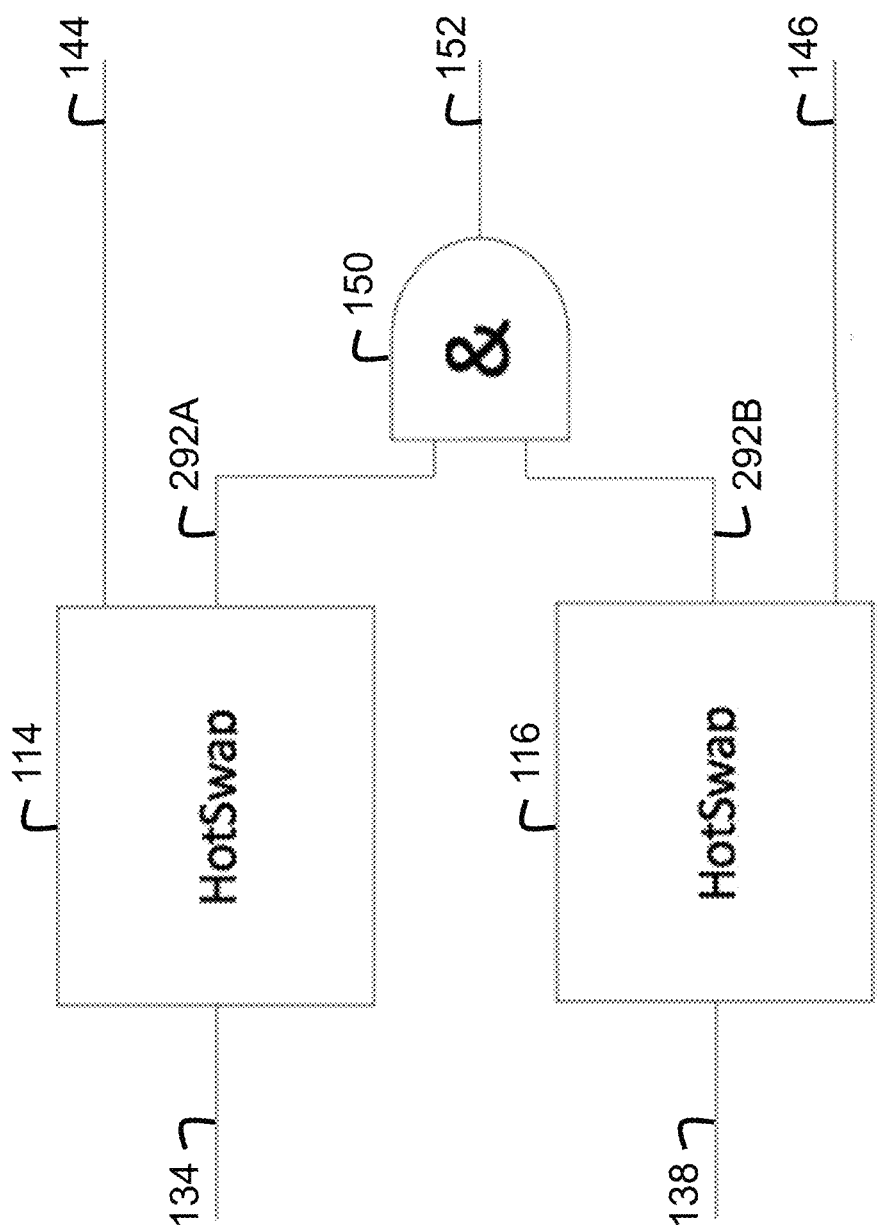
FIG. 4 illustrates how power good signals may be combined in accordance with an embodiment of the present technology.

Servers 370 complying with ATX specification require the provision of a power good signal, also called a 'PWR_OK' signal, to be provided by an ATX power supply before starting to use 12V power. In an aspect of the present technology, power good signals provided by the HSM 114 and 116 may be combined to emulate the power good signal that the server 370 may expect to receive from a conventional ATX power supply. As expressed in the description of the generic HSM 200 (FIG. 2), a power good signal may be produced by the controller 240 and amplified by the amplifier buffer 290 when the HSM 200 allows power to be transmitted between its power input 210 and its power output 220. FIG. 4 illustrates how power good signals may be combined. As expressed in the description of FIG. 1, the HSM 114 may receive DC power at 5V from the output 134 of the DC/DC power converter 132. Likewise, the HSM 116 may receive DC power at 3.3V from the output 138 pf the DC/DC power converter 136. As also expressed in the description of FIG. 2, each HSM may include an output 292 for transmitting a power good signal when no fault condition is detected by the HSM. As shown on FIG. 4, the HSM 114 includes an output 292A (which may be provided directly by the controller 240 internal to the HSM 114 or by the amplifier buffer 290, if present) for issuing a power good signal when 5V power is available for use at the power input 144 of the respective load 106 (i.e. the ATX-compliant server 370). Likewise, the HSM 116 includes an output 292B (which may be provided directly by the controller 240 internal to the HSM 116 or by the amplifier buffer 290, if present) for issuing a power good signal when 3.3V power is available for use at the power input 146 of the respective load 106 (i.e. the ATX-compliant server 370). A logic gate 150 (i.e. an AND gate) combines the power good signals that may be present on the outputs 292A and 292B and issues a combined power good signal 152 when power is concurrently available at 5V and 3.3V. Should one of the HSM 114 or 116 detect a fault condition, the HSM 114 or 116 will open its internal switch 280 and remove the power good signal. The logic gate 150 no longer having power good signals at both its inputs will remove the combined power good signal 152, thereby informing the respective server 370 of the fault condition at the same time as the 5V or 3.3V power is removed.

Figure 5:
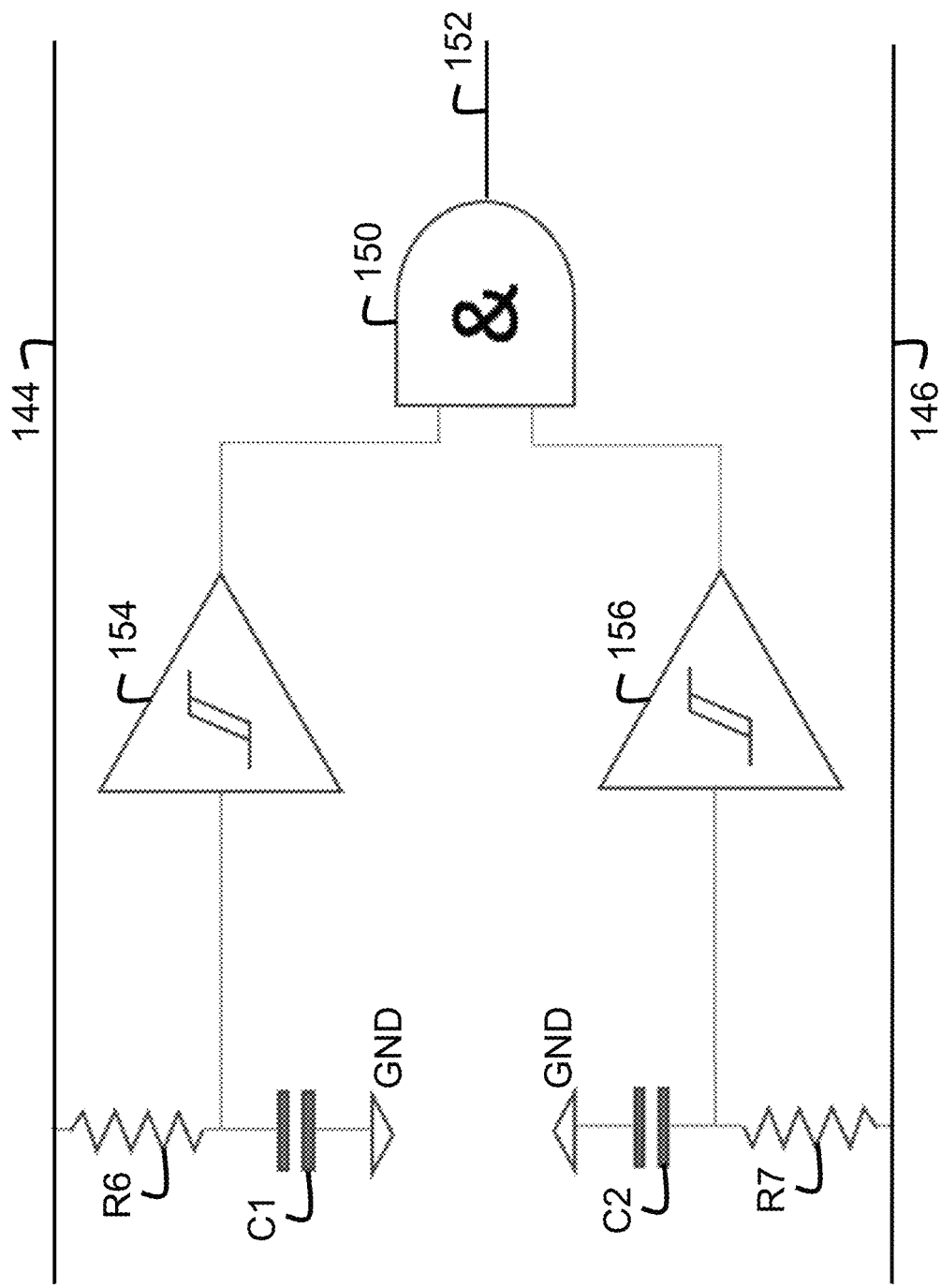
FIG. 5 illustrates another technique for generating a combined power good signal in accordance with an embodiment of the present technology.

FIG. 5 illustrates another technique for generating a combined power good signal. A configuration shown in FIG. 5 does not use any power good signal generated by the HSM 114 and 116. Instead, the 5V power for delivery to the power input 144 of the respective load 106 (i.e. the ATX-compliant server 370) is applied to a series combination of a resistor R6 and a capacitor C1 connected to ground. A voltage present between the resistor R6 and the capacitor C1 rapidly increases to reach the value output by the HSM 114 when the 5V power first becomes available. This voltage is applied to a Schmitt trigger 154 that generates the equivalent of a power good signal for application on the logic gate 150. Similarly, the 3.3V power for delivery to the power input 146 of the respective load 106 (i.e. the ATX-compliant server 370) is applied to a series combination of a resistor R7 and a capacitor C2 connected to ground. A voltage present between the resistor R7 and the capacitor C2 rapidly increases to reach the value output by the HSM 116 when the 3.3V power first becomes available. This voltage is applied to another Schmitt trigger 156 that generates the equivalent of a power good signal for application on the logic gate 150. The logic gate 150 issues the combined power good signal 152 when both Schmitt triggers 154 and 156 are activated. Should one of the HSM 114 or 116 detect a fault and open its internal switch, the corresponding Schmitt trigger 154 or 156 will remove its equivalent of the power good signal. It may be observed that the Schmitt triggers 154 and 156 are expected to maintain their state when voltages applied thereon vary by less than a threshold, so that small and transient voltage variations will not cause a loss of power good signals.

Combining power good signals from the other HSMs 112 and 118 using a logic gate having four inputs is contemplated. It is noted, however, that a server 370 that complies with the ATX specification expects to use the 5V_sb power before arrival of the power good signal. Additionally, the availability of 5V and 3.3V power depends on prior availability of 12V power at the DC/DC power converters 132 and 136, a power good signal from the HSM 112 would be redundant in the particular configuration of FIG. 1. Therefore, combining power good signals may be useful when other type of loads 106 receive power from the power distribution arrangement 100.

FIGS. 6a, 6b, 6c, 6d, and 6e are a sequence diagram showing operations of a method for providing electric power from a plurality of power supplies to a plurality of loads 106. On these Figures, a sequence 400 comprises a plurality of operations, some of which may be executed in variable order, some of the operations possibly being executed concurrently, some of the operations being optional. The sequence 400 is presented in the following paragraph with reference to components of the power distribution arrangement 100 of FIG. 1, for ease of understanding. It should be understood, however, that various embodiments of the sequence 400 may depart from the power distribution arrangement 100. For example and without limitation, while FIG. 1 illustrates an embodiment in which four distinct voltages (including a standby voltage) may be provided to a particular type of load 106 (e.g. the server 370), embodiments in which more or less than four voltages are used to power other types of loads 106 are also contemplated.

The sequence 400 comprises operation 402 (FIG. 6a), when power outputs (e.g. power output 120) of the plurality of power supplies (e.g. AC/DC power converters 104) are combined to provide power at a first voltage (e.g. 12V). At operation 404, power is delivered at the first voltage to a plurality of first hot swap modules (e.g. HSM 112). Each first hot swap module is electrically connected to a first power input of a corresponding one of the plurality of loads 106 (e.g. power input 142 of the load 106). One or more of operations 406, 408 and 410, and either one of operations 412 or 414, are executed by each first hot swap module. Operation 406 may verify if there is an undervoltage fault condition. There is no undervoltage if the first voltage is at least equal to a first minimum voltage threshold. If no undervoltage fault condition is detected, operation 408 may verify if there is an overvoltage fault condition. There is no overvoltage if the first voltage does not exceed a first maximum voltage threshold. If there is no overvoltage condition, operation 410 may verify if there is an overcurrent fault condition. There is no overcurrent if a current consumed by the load 106 at the first voltage does not exceed a first maximum current threshold. If no fault condition is detected at operations 406, 408 or 410, power is delivered at the first voltage to the first power input of the corresponding load 106 at operation 412. If a fault condition is found at any of operations 406, 408 or 410, the first power input of the corresponding load 106 is isolated from the plurality of power supplies at operation 414. It should be observed that operations 406, 408 and 410 may be executed in any order and may be executed concurrently, in particular when the first hot swap modules are constructed in the manner shown on FIG. 2.

Figure 6A:
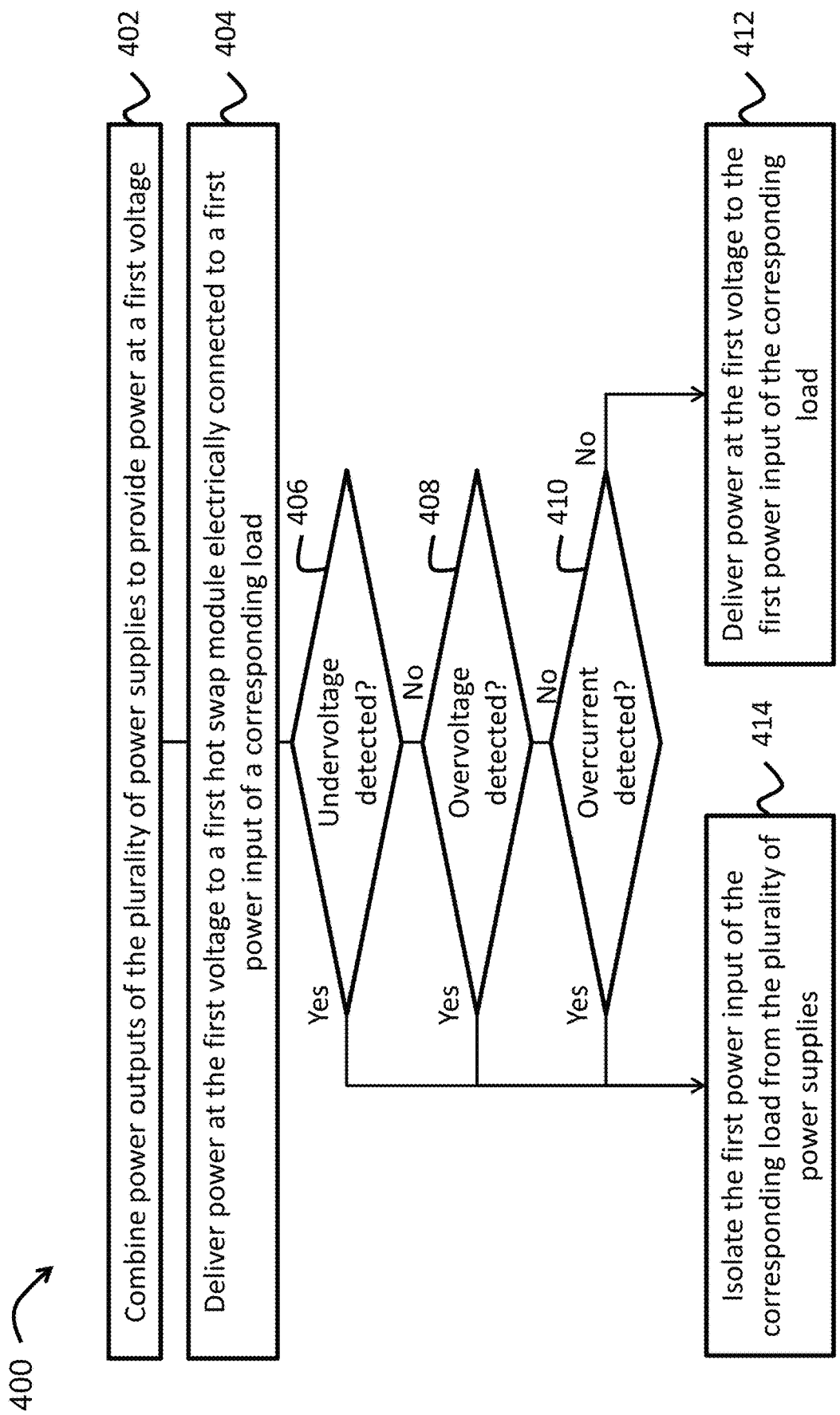
FIGS. 6a, 6b, 6c, 6d, and 6e are a sequence diagram showing operations of a method for providing electric power from a plurality of power supplies to a plurality of loads in accordance with an embodiment of the present technology.
Figure 6B:
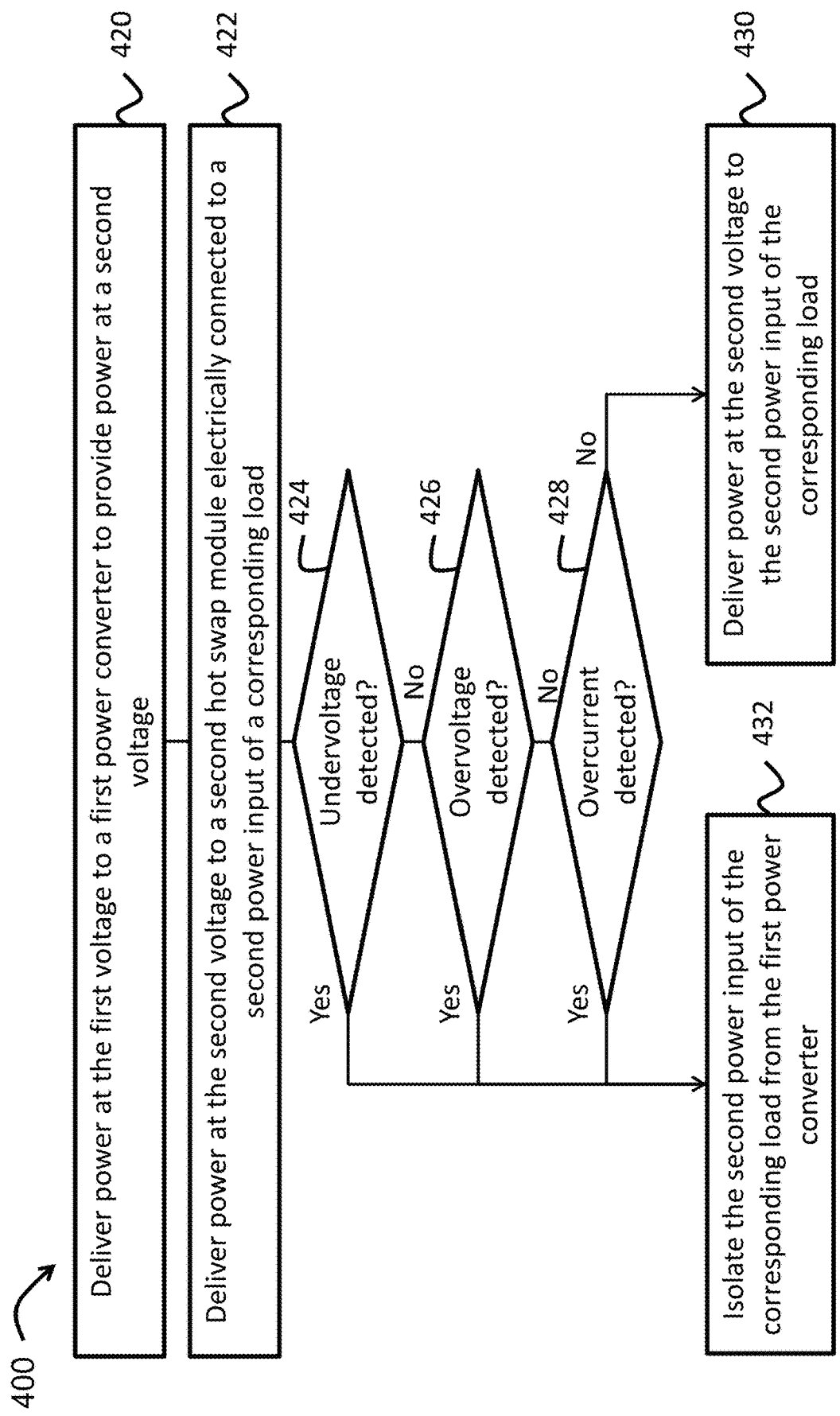

Continuing in FIG. 6b, operations 420 to 432 may be executed in parallel or concurrently with operations 404 to 414. Operation 420, which follows operation 402, comprises delivering power at the first voltage to a first power converter (e.g. DC/DC power converter 132) to provide power at a second voltage (e.g. 5V). Then, operations 422 to 432 mirror operations 404 to 414, being executed for delivering power at the second voltage.

At operation 422, power is delivered at the second voltage to a plurality of second hot swap modules (e.g. HSM 114). Each second hot swap module is electrically connected to a second power input of a corresponding one of the plurality of loads 106 (e.g. power input 144 of the load 106). One or more of operations 424, 426 and 428, and either one of operations 430 or 432, are executed by each second hot swap module. Operation 424 may verify if there is an undervoltage fault condition. There is no undervoltage if the second voltage is at least equal to a second minimum voltage threshold. If no undervoltage fault condition is detected, operation 426 may verify if there is an overvoltage fault condition. There is no overvoltage if the second voltage does not exceed a second maximum voltage threshold. If there is no overvoltage condition, operation 428 may verify if there is an overcurrent fault condition. There is no overcurrent if a current consumed by the load 106 at the second voltage does not exceed a second maximum current threshold. If no fault condition is detected at operations 424, 426 or 428, power is delivered at the second voltage to the second power input of the corresponding load 106 at operation 430. If a fault condition is found at any of operations 424, 426 or 428, the second power input of the corresponding load 106 is isolated from the first power converter at operation 432. Operations 424, 426 and 428 may also be executed in any order and may be executed concurrently, in particular when the second hot swap modules are constructed in the manner shown on FIG. 2.

Figure 6C:
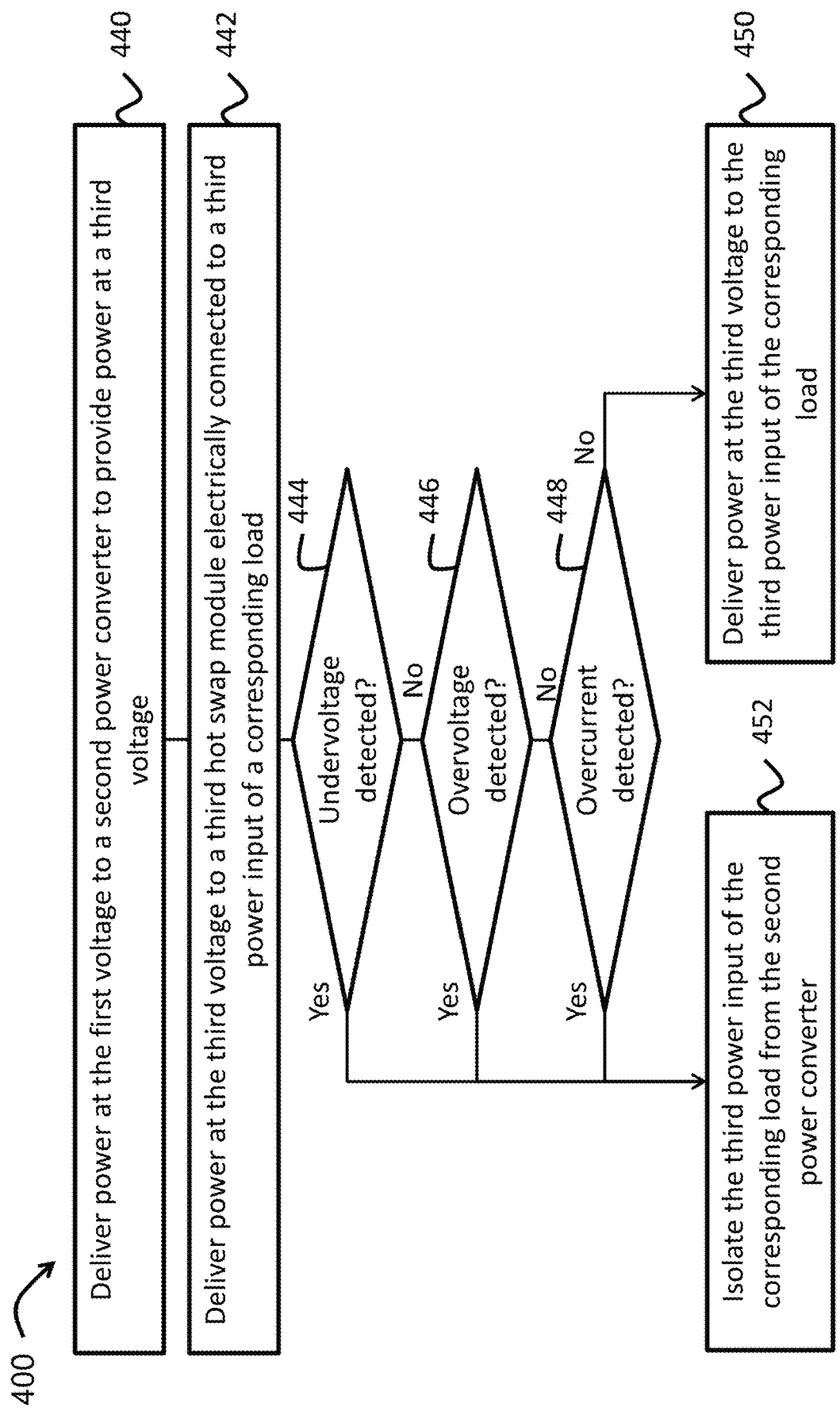

Continuing in FIG. 6c, operations 440 to 452 may be executed in parallel or concurrently with operations 404 to 414 and/or with operations 420 to 432. Operation 440, which follows operation 402, comprises delivering power at the first voltage to a second power converter (e.g. DC/DC power converter 136) to provide power at a third voltage (e.g. 3.3V). Delivering power at the second voltage to the second power converter to provide the power at the third voltage is also contemplated. Then, operations 442 to 452 mirror operations 404 to 414 and/or operations 422 to 432, being executed for delivering power at the third voltage.

At operation 442, power is delivered at the third voltage to a plurality of third hot swap modules (e.g. HSM 116). Each third hot swap module is electrically connected to a third power input of a corresponding one of the plurality of loads 106 (e.g. power input 146 of the load 106). One or more of operations 444, 446 and 448, and either one of operations 450 or 452, are executed by each third hot swap module. Operation 444 may verify if there is an undervoltage fault condition. There is no undervoltage if the third voltage is at least equal to a third minimum voltage threshold. If no undervoltage fault condition is detected, operation 446 may verify if there is an overvoltage fault condition. There is no overvoltage if the third voltage does not exceed a third maximum voltage threshold. If there is no overvoltage condition, operation 448 may verify if there is an overcurrent fault condition. There is no overcurrent if a current consumed by the load 106 at the third voltage does not exceed a third maximum current threshold. If no fault condition is detected at operations 444, 446 or 448, power is delivered at the third voltage to the third power input of the corresponding load 106 at operation 450. If a fault condition is found at any of operations 444, 446 or 448, the third power input of the corresponding load 106 is isolated from the first power converter at operation 452. Operations 444, 446 and 448 may also be executed in any order and may be executed concurrently, in particular when the third hot swap modules are constructed in the manner shown on FIG. 2.

Figure 6D:
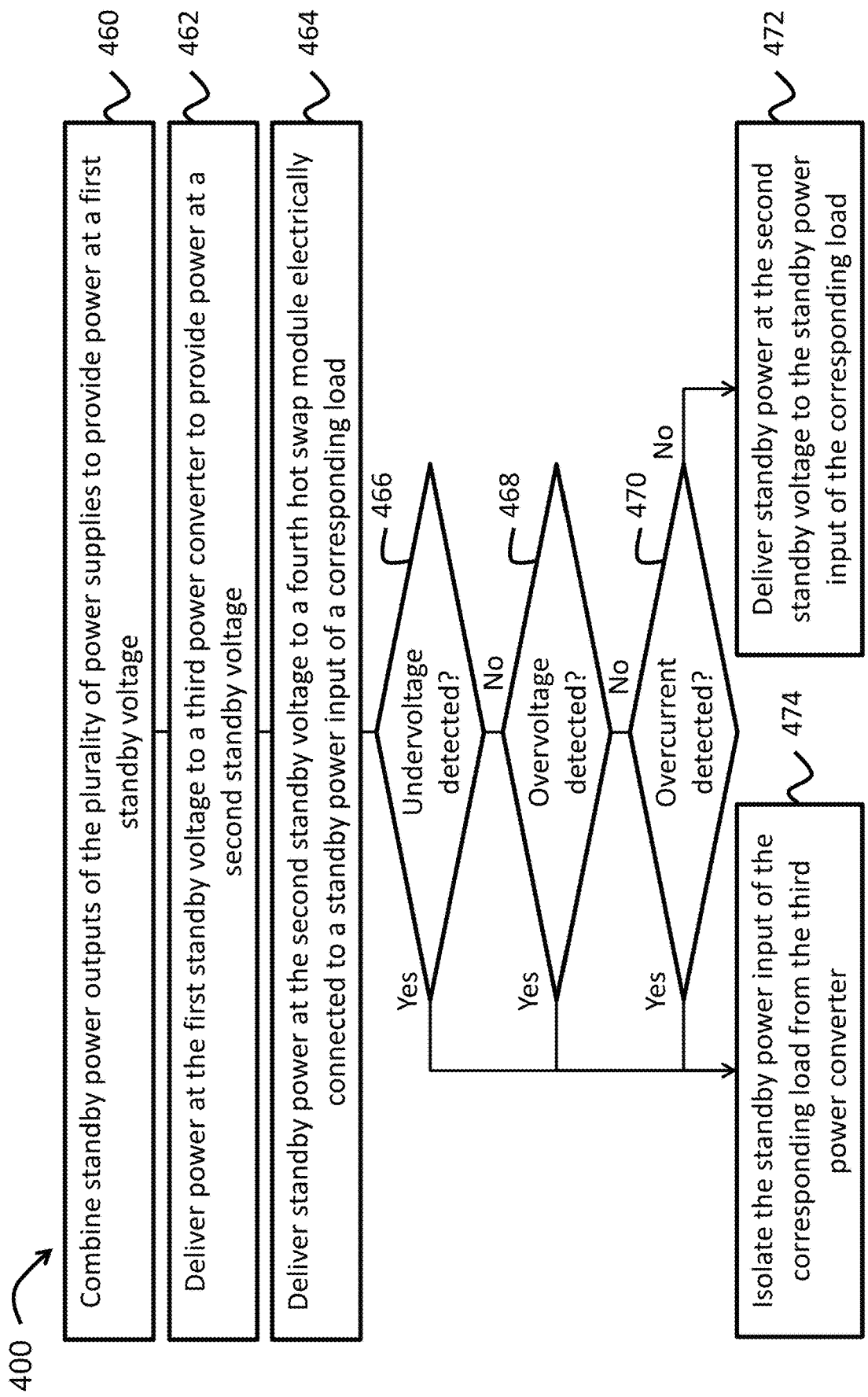

Continuing in FIG. 6d, in some embodiments, operations 460 to 474 may be executed in parallel with some of the operations of FIGS. 6a, 6b and 6c. In particular embodiments wherein the first, second and third voltage and a standby voltage are provided to loads 106, for example servers, that comply with ATX specifications, operations 460 to 474 may precede other operations of the sequence 400, as ATX-compliant servers are constructed to receive standby power before starting to consume power at other voltages.

Standby power outputs (e.g. standby power output 124) of the plurality of power supplies (e.g. AC/DC power converters 104) are combined to provide standby power at a first standby voltage (e.g. 12V_sb) at operation 460. Then, operation 462 comprises delivering power at the first standby voltage to a third power converter (e.g. DC/DC power converter 126) to provide power at a second standby voltage (e.g. 5V_sb). Operations 464 to 474 mirror operations described in FIGS. 6a, 6b and 6c, being executed for delivering power at the second standby voltage.

At operation 464, standby power is delivered at the second standby voltage to a plurality of fourth hot swap modules (e.g. HSM 118). Each fourth hot swap module is electrically connected to a standby power input of a corresponding one of the plurality of loads 106 (e.g. standby power input 148 of the load 106). One or more of operations 466, 468 and 468, and either one of operations 472 or 474, are executed by each fourth hot swap module. Operation 466 may verify if there is an undervoltage fault condition. There is no undervoltage if the second standby voltage is at least equal to a minimum standby voltage threshold. If no undervoltage fault condition is detected, operation 468 may verify if there is an overvoltage fault condition. There is no overvoltage if the second standby voltage does not exceed a maximum standby voltage threshold. If there is no overvoltage condition, operation 470 may verify if there is an overcurrent fault condition. There is no overcurrent if a current consumed by the load 106 at the second standby voltage does not exceed a maximum standby current threshold. If no fault condition is detected at operations 466, 468 or 470, standby power is delivered at the second standby voltage to the standby power input of the corresponding load 106 at operation 472. If a fault condition is found at any of operations 466, 468 or 470, the standby power input of the corresponding load 106 is isolated from the third power converter at operation 474. Operations 466, 468 and 470 may also be executed in any order and may be executed concurrently, in particular when the fourth hot swap modules are constructed in the manner shown on FIG. 2.

Figure 6E:
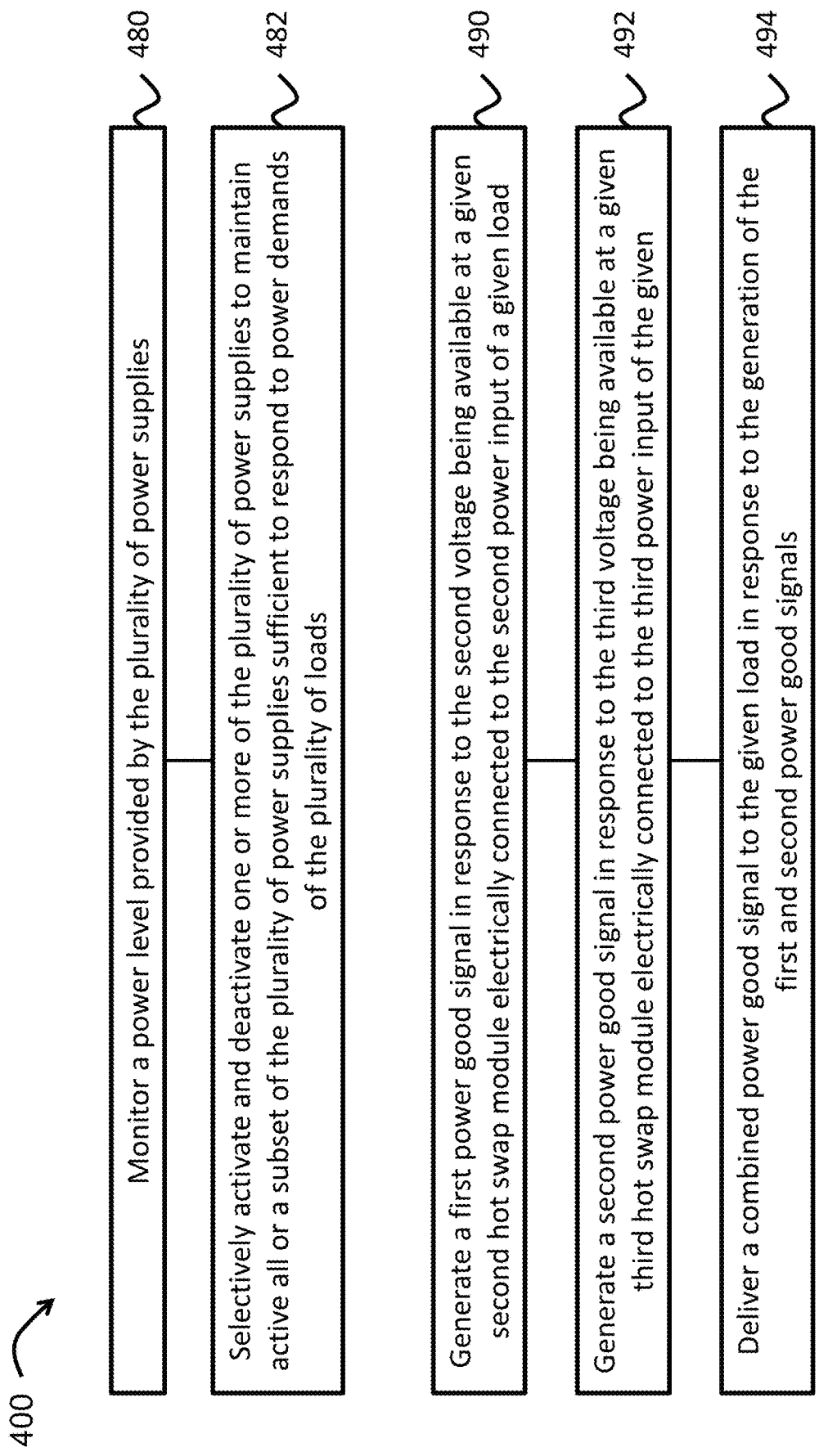

Continuing in FIG. 6e, some operations may be executed at any time in the course of the sequence 400, including when power is being delivered to some or all of the loads 106. For example, a power level provided by the plurality of power supplies may be monitored at operation 480. Based on the power delivery capabilities of the power supplies and based on a current power demands from the plurality of loads 106, one or more of the plurality of power supplies may be selectively activated or deactivated at operation 482, in order to maintain active all or a subset of the plurality of power supplies sufficient to respond to power demands of the plurality of loads 106. In some embodiments, the number of loads 106 included in the power arrangement 100 (FIG. 1) may be selected as function of the number of power supplies so that power supply redundancy may be available, should one of the power supplies fail. In some embodiments, the number of loads 106 may be greater than the number of power supplies.

In some embodiments, the loads 106 may include ATX-compliant servers 370 (FIG. 3), each of which includes a respective first power input 142, a respective second power input 144, a respective third power input 146 and a respective standby power input 148. These servers 370, and any other ATX-compliant load, should initially receive standby power at the second standby voltage and then wait until they receive a power good signal before actually starting to consume power on their first, second and third power inputs. In an embodiment, the sequence 400 includes an operation 490 for generating, at each second hot swap module, a first power good signal in response to the second voltage being available at that second hot swap module. Operation 490 follows operation 430 (FIG. 6b). Operation 492 comprises generating, at each third hot swap module, a second power good signal in response to the third voltage being available at that third hot swap module. Operation 492 follows operation 450 (FIG. 6c). Then, operation 484 comprises delivering, in response to the generation of the first and second power good signals, a combined power good signal to the load 106 connected to these second and first hot swap modules.

In other embodiments, the plurality of loads 106 may comprise a first subset of loads 106 of a first type and a second subset of loads 106 of a second type. Non-limiting examples of types of loads 106 include capacitors, hard disc drives, fans, and the like. These various loads 106 may consume power at various voltages. Hence, power may selectively be delivered to the loads 106 of the first subset at the first voltage and may selectively be delivered to the loads 106 of the second subset at the second voltage.

Figure 7:
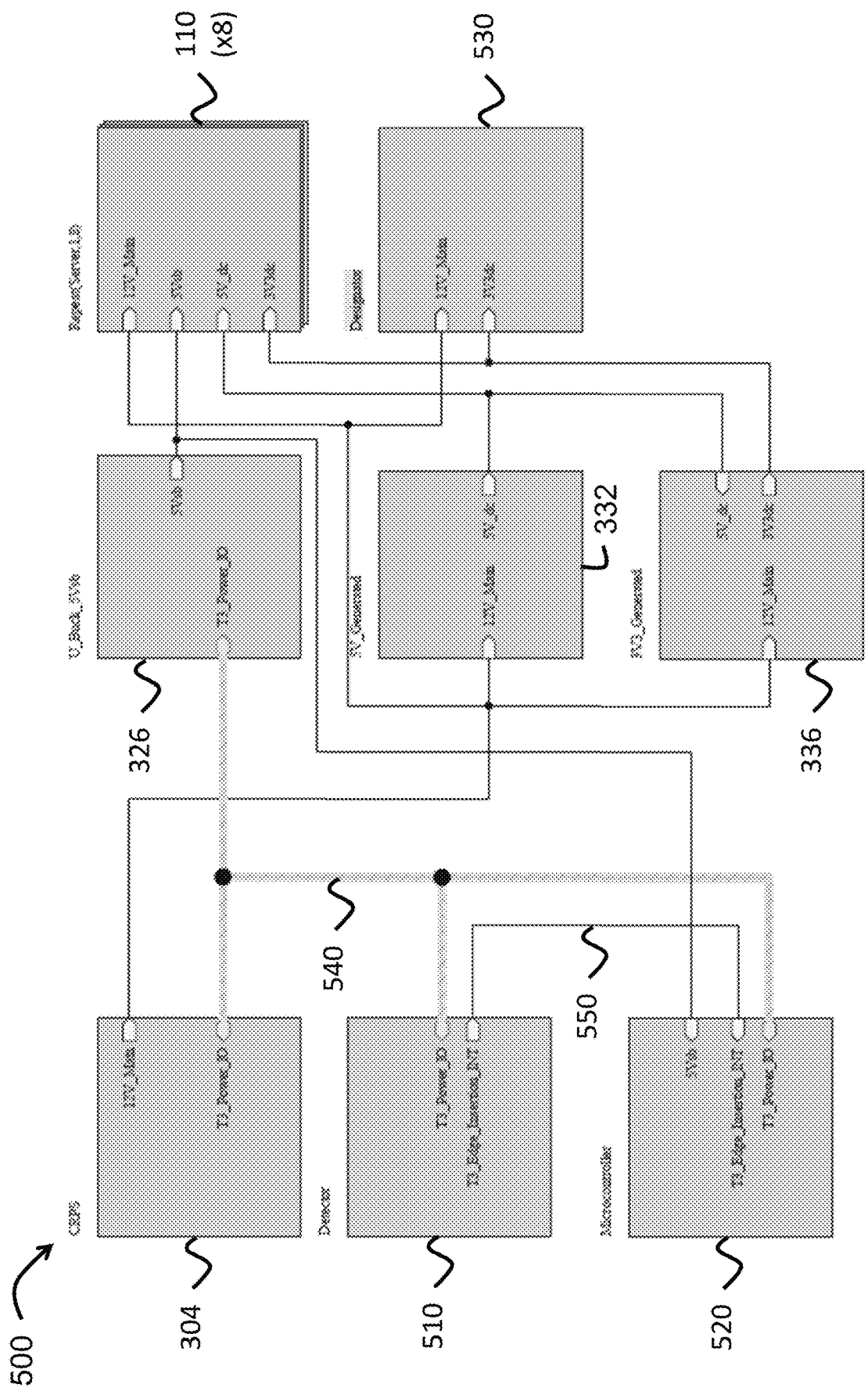
FIG. 7 illustrates a Tier 3 power distribution arrangement in accordance with an embodiment of the present technology.

FIG. 7 illustrates a Tier 3 power distribution arrangement 500. The arrangement 500 complies with Tier 3 definitions for availability requirements for data centers. The arrangement 500 comprises several of the components introduced in the description of FIGS. 1, 2 and 3, including a plurality of CRPSs 304 (for example four CRPSs 304), the DC/DC regulators 326 (for example four DC/DC regulators 326), the DC/DC supply 332, the DC/DC supply 336 and the combinations 110 containing one load 106 and HSMs 112, 114, 116 and 118 (repeated plural times in parallel, for example eight times). The arrangement 500 further comprises a CRPS insertion detector 510, a microcontroller 520, and a designator 530.

In the arrangement 500, DC power at 12V, 5V, 3.3V and standby power at 5V_sb is distributed between the various components in the same manner as expressed in the description of earlier Figures.

A wiring harness 540 extends between the CRPSs 304, the DC/DC regulators 326, the CRPS insertion detector 510 and the microcontroller 520. The harness 540 comprises a plurality of wires (not shown). One wire in the harness 540 delivers 12V_sb standby power from each of the CRPSs 304 to a respective DC/DC regulator 326. One other wire in the harness 540 delivers a presence signal for each of the CRPSs 304 to the CRPS insertion detector 510. The CRPS insertion detector 510 emits an availability signal on a wire 550 connected to the microcontroller 520 to indicate that 12V power and 12V_sb power are available in the arrangement 500. The presence signals are also applied to the microcontroller 520.

The harness 540 also comprise other wires for providing power good signals from each of the CRPSs 304, as well as wires for providing an eventual slow overcurrent warning signal from each of the CRPSs 304 to the microcontroller 520. The microcontroller uses these slow overcurrent warning signals to determine when some of the CRPSs 304 should be selectively activated or deactivated in order to maintain active all or a subset of the CRPSs 304 sufficient to respond to power demands of the plurality of loads 106, for example servers, in the combinations 110.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

As such, the methods and systems implemented in accordance with some non-limiting embodiments of the present technology can be represented as follows, presented in numbered clauses.

Clauses

[Clause 1] A method (400) for providing electric power from a plurality of power supplies (104) to a plurality of loads (106), the method (400) comprising:
  combining (402) power outputs (120) of the plurality of power supplies (104) to provide power at a first voltage;
  delivering power (404) at the first voltage to a plurality of first hot swap modules (112), each first hot swap module (112) being electrically connected to a first power input (142) of a corresponding one of the plurality of loads (106); and
  at each first hot swap module (112):
    verifying one or more first conditions selected from the first voltage being at least equal to a first minimum voltage threshold (406), the first voltage not exceeding a first maximum voltage threshold (408), and a current consumed by the load (106) at the first voltage not exceeding (410) a first maximum current threshold (410),
    selectively delivering power (412) at the first voltage to the first power input (142) of the corresponding load (106) in response to the one or more first conditions being met, and isolating (414) the first power input (142) of the corresponding load (106) from the plurality of power supplies (104) in response to any one of the one or more first conditions not being met.

[Clause 2] The method (400) of clause 1, further comprising:
delivering power (420) at the first voltage to a first power converter (132) to provide power at a second voltage;
delivering power (422) at the second voltage to a plurality of second hot swap modules (114), each second hot swap module (114) being electrically connected to a second power input (144) of a corresponding one of the plurality of loads (106); and
at each second hot swap module (114):
verifying one or more second conditions selected from the second voltage being at least equal to a second minimum voltage threshold (424), the second voltage not exceeding a second maximum voltage threshold (426), and a current consumed by the load (106) at the second voltage not exceeding a second maximum current threshold (428),
selectively delivering power (430) at the second voltage to the second power input (144) of the corresponding load (106) in response to the one or more second conditions being met, and
isolating (432) the second power input (144) of the corresponding load (106) from the first power converter (132) in response to any one of the one or more second conditions not being met.

[Clause 3] The method (400) of clause 1 or 2, further comprising:
delivering power (440) at the first voltage to a second power converter (136) to provide power at a third voltage;
delivering power (442) at the third voltage to a plurality of third hot swap modules (116), each third hot swap module (116) being electrically connected to a third power input (146) of a corresponding one of the plurality of loads (106); and
at each third hot swap module (116):
verifying one or more third conditions selected from the third voltage being at least equal to a third minimum voltage threshold (444), the third voltage not exceeding a third maximum voltage threshold (446), and a current consumed by the load (106) at the third voltage not exceeding a third maximum current threshold (448),
selectively delivering power (450) at the third voltage to the third power input (146) of the corresponding load (106) in response to the one or more third conditions being met, and
isolating (452) the third power input (146) of the corresponding load (106) from the second power converter (136) in response to any one of the one or more third conditions not being met.

[Clause 4] The method (400) of any one of clauses 1 to 3, further comprising:
combining (460) standby power outputs (124) of the plurality of power supplies (104) to provide standby power at a first standby voltage;
delivering standby power (462) at the first standby voltage to a third power converter (126) to provide standby power at a second standby voltage;
delivering standby power (464) at the second standby voltage to a plurality of fourth hot swap modules (118), each fourth hot swap module (118) being electrically connected to a standby power input (148) of a corresponding one of the plurality of loads (106); and
at each fourth hot swap module (118):
verifying one or more fourth conditions selected from the second standby voltage being at least equal to a minimum standby voltage threshold (466), the second standby voltage not exceeding a maximum standby voltage threshold (468), and a current consumed by the load (106) at the second standby voltage not exceeding a maximum standby current threshold (470),
selectively delivering standby power (472) at the second standby voltage to the standby power input (148) of the corresponding load (106) in response to the one or more fourth conditions being met, and
isolating (474) the standby power input (148) of the corresponding load (106) from the third power converter (126) in response to any one of the one or more fourth conditions not being met.

[Clause 5] The method (400) of clause 4, wherein each load (106) comprises a respective first power input (142), a respective second power input (144), a respective third power input (146) and a respective standby power input (148).

[Clause 6] The method (400) of clause 5, further comprising:
generating (490) a first power good signal in response to the second voltage being available at a given second hot swap module (114) electrically connected to the second power input (144) of a given load (106);
generating (492) a second power good signal in response to the third voltage being available at a given third hot swap module (116) electrically connected to the third power input (146) of the given (106); and
delivering (494) a combined power good signal to the given load (106) in response to the generation of the first and second power good signals.

[Clause 7] The method (400) of any one of clauses 1 to 6, further comprising:
monitoring (480) a power level provided by the plurality of power supplies (104); and
selectively activating and deactivating (482) one or more of the plurality of power supplies (104) to maintain active all or a subset of the plurality of power supplies (104) sufficient to respond to power demands of the plurality of loads (106).

[Clause 8] The method (400) of any one of clauses 1 to 7, wherein a number of the plurality of loads (106) is greater than a number of the plurality of power supplies (104).

[Clause 9] The method (400) of clause 8 wherein the number of the plurality of loads (106) is selected as a function of the number of the plurality of power supplies (104) for power supply redundancy.

[Clause 10] The method (400) of clause 2, wherein:
the plurality of loads (106) comprises a first subset of loads (106) of a first type and a second subset of loads (106) of a second type;
power is selectively delivered to the loads (106) of the first subset at the first voltage; and
power is selectively delivered to the loads (106) of the second subset at the second voltage.

[Clause 11] A power distribution circuit (108) for providing electric power from a plurality of power supplies (104) to a plurality of loads (106), the circuit (108) comprising:
a first combiner (122) of power outputs (120) of the plurality of power supplies (104), the first combiner (122) being adapted to provide power at a first voltage; and
a plurality of first hot swap modules (112), each first hot swap module (112) being electrically connected to the first combiner (122) and to a first power input (142) of a corresponding one of the plurality of loads (106), each first hot swap module (112) being adapted to:
    verify one or more first conditions selected from the first voltage being at least equal to a first minimum voltage threshold, the first voltage not exceeding a first maximum voltage threshold, and a current consumed by the load (106) at the first voltage not exceeding a first maximum current threshold,
    selectively deliver power at the first voltage to the first power input (142) of the corresponding load (106) in response to the one or more first conditions being met, and
    isolate the first power input (142) of the corresponding load (106) from the plurality of power supplies (104) in response to any one of the one or more first conditions not being met.

[Clause 12] The circuit (108) of clause 11, further comprising:
    a first power converter (132) electrically connected to the first combiner (122) and adapted to provide power at a second voltage; and
    a plurality of second hot swap modules (114), each second hot swap module (114) being electrically connected to the first power convertor (132) and to a second power input (144) of a corresponding one of the plurality of loads (106), each second hot swap module (114) being adapted to:
        verify one or more second conditions selected from the second voltage being at least equal to a second minimum voltage threshold, the second voltage not exceeding a second maximum voltage threshold, and a current consumed by the load (106) at the second voltage not exceeding a second maximum current threshold,
        selectively deliver power at the second voltage to the second power input (144) of the corresponding load (106) in response to the one or more second conditions being met, and
        isolate the second power input (144) of the corresponding load (106) from the first power converter (132) in response to any one of the one or more second conditions not being met.

[Clause 13] The circuit (108) of clause 11 or 12, further comprising:
    a second power converter (136) electrically connected to the first combiner (122) and adapted to provide power at a third voltage; and
    a plurality of third hot swap modules (116), each third hot swap module (116) being electrically connected to the second power convertor (136) and to a third power input (146) of a corresponding one of the plurality of loads (106), each third hot swap module (116) being adapted to:
        verify one or more third conditions selected from the third voltage being at least equal to a third minimum voltage threshold, the third voltage not exceeding a third maximum voltage threshold, and a current consumed by the load (106) at the third voltage not exceeding a third maximum current threshold,
        selectively deliver power at the third voltage to the third power input (146) of the corresponding load (106) in response to the one or more third conditions being met, and
        isolate the third power input (146) of the corresponding load (106) from the second power converter (136) in response to any one of the one or more third conditions not being met.

[Clause 14] The circuit (108) of any one of clauses 11 to 13, further comprising:
    a plurality of third power converters (126), each third power converter (126) being electrically connected to a standby power output (124) of a corresponding power supply (104) for receiving power at a first standby voltage, each third power converter (126) being adapted to provide standby power at a second standby voltage;
    a second combiner (130) electrically connected to the plurality of third power converters (126), the second combiner (130) being adapted to combine the standby power at the second standby voltage; and
    a plurality of fourth hot swap modules (118), each fourth hot swap module (118) being electrically connected to the second combiner (130) and to a standby power input (148) of a corresponding one of the plurality of loads (106), each fourth hot swap module (118) being adapted to:
        verify one or more fourth conditions selected from the second standby voltage being at least equal to a minimum standby voltage threshold, the second standby voltage not exceeding a maximum standby voltage threshold, and a current consumed by the load (106) at the second standby voltage not exceeding a maximum standby current threshold,
        selectively deliver standby power at the second standby voltage to the standby power input (148) of the corresponding load (106) in response to the one or more fourth conditions being met, and
        isolate the standby power input (148) of the corresponding load (106) from the third power converter (126) in response to any one of the one or more fourth conditions not being met.

[Clause 15] The circuit (108) of any one of clauses 11 to 13, further comprising:
    a second combiner of standby power outputs 124 of the plurality of power supplies (104), the second combiner being adapted to provide standby power at a first standby voltage;
    a third power converter (126) electrically connected to the second combiner and adapted to provide standby power at a second standby voltage; and
    a plurality of fourth hot swap modules (118), each fourth hot swap module (118) being electrically connected to the third power convertor (126) and to a standby power input (148) of a corresponding one of the plurality of loads (106), each fourth hot swap module (118) being adapted to:
        verify one or more fourth conditions selected from the second standby voltage being at least equal to a minimum standby voltage threshold, the second standby voltage not exceeding a maximum standby voltage threshold, and a current consumed by the load (106) at the second standby voltage not exceeding a maximum standby current threshold,
        selectively deliver standby power at the second standby voltage to the standby power input (148) of the corresponding load (106) in response to the one or more fourth conditions being met, and
        isolate the standby power input (148) of the corresponding load (106) from the third power converter (126) in response to any one of the one or more fourth conditions not being met.

[Clause 16] The circuit (108) of clause 14 or 15, wherein each load (106) comprises a respective first power input (142), a respective second power input (144), a respective third power input (146) and a respective standby power input (148).

[Clause 17] The circuit (108) of clause 16, wherein:
  each second hot swap module (114) is adapted to generate a first power good signal in response to the second voltage being available at the second hot swap module (114);
  each third hot swap module (116) is adapted to generate a second power good signal in response to the third voltage being available at the third hot swap module (116); and
  the circuit (108) further comprises a plurality of logic gates (150), each logic gate (150) being adapted to:
    combine the first power good signal generated by a given second hot swap module (114) electrically connected to the second power input (144) of a given load (106) with the second power good signal generated by a given third hot swap module (116) electrically connected to the third power input (146) of the given load (106), and
    deliver the combined power good signal to the given load (106).

[Clause 18] The circuit (108) of clause 16 or 17, wherein:
  each load (106) is a server (370); and
  the first voltage, the second voltage, the third voltage and the second standby voltage comply with an ATX specification.

[Clause 19] The circuit (108) of any one of clauses 11 to 18, further comprising a controller (520) operatively connected to the plurality of power supplies (104) and adapted to:
  monitor a power level provided by the plurality of power supplies (104); and
  selectively activate and deactivate one or more of the plurality of power supplies (104) to maintain active all or a subset of the plurality of power supplies (104) sufficient to respond to power demands of the plurality of loads (106).

[Clause 20] The circuit (108) of any one of clauses 11 to 19, wherein a number of the plurality of loads (106) is greater than a number of the plurality of power supplies (104).

[Clause 21] The circuit (108) of clause 20, wherein the number of the plurality of loads (106) is selected as a function of the number of the plurality of power supplies (104) for power supply redundancy.

[Clause 22] The circuit (108) of clause 12, wherein:
  the plurality of loads (106) comprises a first subset of loads (106) of a first type and a second subset of loads (106) of a second type;
  power is selectively delivered to the loads (106) of the first subset at the first voltage; and
  power is selectively delivered to the loads (106) of the second subset at the second voltage.

[Clause 23] The circuit (108) of clause 22, wherein the loads (106) of the first type comprise hard disc drives and the loads (106) of the second type comprise fans.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for providing electric power from a plurality of common redundant power supplies (CRPS) to a plurality of loads, the method comprising:
  combining power outputs of the plurality of CRPSs to provide power at a first voltage;
  delivering power at the first voltage from the combined power outputs of the plurality of CRPSs to a plurality of first hot swap modules, each first hot swap module being electrically connected to a first power input of a corresponding one of the plurality of loads; and
  at each first hot swap module:
    verifying first conditions comprising the first voltage at the first power input of the corresponding one of the plurality of loads being at least equal to a first minimum voltage threshold, the first voltage not exceeding a first maximum voltage threshold, and a current consumed by the load at the first voltage not exceeding a first maximum current threshold,
    selectively delivering power at the first voltage to the first power input of the corresponding load in response to the first conditions being met, and
    isolating the first power input of the corresponding load from the plurality of CRPSs without isolating the first power input of the remaining ones of the plurality of loads in response to any one of the first conditions not being met;
  delivering standby power at a first standby voltage from standby power outputs of the plurality of CRPSs to a corresponding plurality of third power converters;
  combining power outputs of the plurality of third power converters to provide standby power at a second standby voltage;
  delivering standby power at the second standby voltage from the third power converter to a plurality of fourth hot swap modules, each fourth hot swap module being electrically connected to a standby power input of a corresponding one of the plurality of loads; and
  at each fourth hot swap module:
    verifying one or more fourth conditions selected from the second standby voltage being at least equal to a minimum standby voltage threshold, the second standby voltage not exceeding a maximum standby voltage threshold, and a current consumed by the load at the second standby voltage not exceeding a maximum standby current threshold,
    selectively delivering standby power at the second standby voltage to the standby power input of the corresponding load in response to the one or more fourth conditions being met, and
    isolating the standby power input of the corresponding load from the third power converter in response to any one of the one or more fourth conditions not being met.

2. The method of claim 1, further comprising:
  delivering power at the first voltage from the combined power outputs of the plurality of CRPSs to a first power converter to provide power at a second voltage;
  delivering power at the second voltage from the first power converter to a plurality of second hot swap modules, each second hot swap module being electrically connected to a second power input of a corresponding one of the plurality of loads; and
  at each second hot swap module:
    verifying one or more second conditions selected from the second voltage being at least equal to a second minimum voltage threshold, the second voltage not exceeding a second maximum voltage threshold, and a current consumed by the load at the second voltage not exceeding a second maximum current threshold, selectively delivering power at the second voltage to the second power input of the corresponding load in response to the one or more second conditions being met, and isolating the second power input of the corresponding load from the first power converter in response to any one of the one or more second conditions not being met.

3. The method of claim 1, further comprising:

delivering power at the first voltage from the combined power outputs of the plurality of CRPSs to a second power converter to provide power at a third voltage;

delivering power at the third voltage from the second power converter to a plurality of third hot swap modules, each third hot swap module being electrically connected to a third power input of a corresponding one of the plurality of loads; and at each third hot swap module:
verifying one or more third conditions selected from the third voltage being at least equal to a third minimum voltage threshold, the third voltage not exceeding a third maximum voltage threshold, and a current consumed by the load at the third voltage not exceeding a third maximum current threshold, selectively delivering power at the third voltage to the third power input of the corresponding load in response to the one or more third conditions being met, and isolating the third power input of the corresponding load from the second power converter in response to any one of the one or more third conditions not being met.

4. A power distribution circuit for providing electric power from a plurality of common redundant power supplies (CRPS) to a plurality of loads, the circuit comprising:

a first combiner of power outputs of the plurality of CRPSs, the first combiner being configured to provide power at a first voltage; and a plurality of first hot swap modules, each first hot swap module being electrically connected to the first combiner and to a first power input of a corresponding one of the plurality of loads, each first hot swap module being configured to:
verify first conditions comprising the first voltage at the first power input of the corresponding one of the plurality of loads being at least equal to a first minimum voltage threshold, the first voltage not exceeding a first maximum voltage threshold, and a current consumed by the load at the first voltage not exceeding a first maximum current threshold, selectively deliver power at the first voltage to the first power input of the corresponding load in response to the first conditions being met, and isolate the first power input of the corresponding load from the plurality of CRPSs without isolating the first power input of the remaining ones of the plurality of loads in response to any one of the first conditions not being met;

a plurality of third power converters, each third power converter being electrically connected to a standby power output of a corresponding CRPS for receiving power at a first standby voltage, each third power converter being configured to provide standby power at a second standby voltage;

a second combiner electrically connected to power outputs of the plurality of third power converters, the second combiner being configured to combine the standby power at the second standby voltage; and a plurality of fourth hot swap modules, each fourth hot swap module being electrically connected to the second combiner and to a standby power input of a corresponding one of the plurality of loads, each fourth hot swap module being configured to:
verify one or more fourth conditions selected from the second standby voltage being at least equal to a minimum standby voltage threshold, the second standby voltage not exceeding a maximum standby voltage threshold, and a current consumed by the load at the second standby voltage not exceeding a maximum standby current threshold, selectively deliver standby power at the second standby voltage to the standby power input of the corresponding load in response to the one or more fourth conditions being met, and isolate the standby power input of the corresponding load from the third power converter in response to any one of the one or more fourth conditions not being met.

5. The circuit of claim 4, further comprising:

a first power converter electrically connected to the first combiner and configured to provide power at a second voltage; and a plurality of second hot swap modules, each second hot swap module being electrically connected to the first power convertor and to a second power input of a corresponding one of the plurality of loads, each second hot swap module being configured to:
verify one or more second conditions selected from the second voltage being at least equal to a second minimum voltage threshold, the second voltage not exceeding a second maximum voltage threshold, and a current consumed by the load at the second voltage not exceeding a second maximum current threshold, selectively deliver power at the second voltage to the second power input of the corresponding load in response to the one or more second conditions being met, and isolate the second power input of the corresponding load from the first power converter in response to any one of the one or more second conditions not being met.

6. The circuit of claim 4, further comprising:

a second power converter electrically connected to the first combiner and configured to provide power at a third voltage; and a plurality of third hot swap modules, each third hot swap module being electrically connected to the second power convertor and to a third power input of a corresponding one of the plurality of loads, each third hot swap module being configured to:
verify one or more third conditions selected from the third voltage being at least equal to a third minimum voltage threshold, the third voltage not exceeding a third maximum voltage threshold, and a current consumed by the load at the third voltage not exceeding a third maximum current threshold, selectively deliver power at the third voltage to the third power input of the corresponding load in response to the one or more third conditions being met, and isolate the third power input of the corresponding load from the second power converter in response to any one of the one or more third conditions not being met.

7. The circuit of claim 4, wherein each load comprises a respective first power input, a respective second power input, a respective third power input and a respective standby power input.

8. The circuit of claim 7, wherein:

each second hot swap module is configured to generate a first power good signal in response to the second voltage being available at the second hot swap module;

each third hot swap module is configured to generate a second power good signal in response to the third voltage being available at the third hot swap module; and the circuit further comprises a plurality of logic gates, each logic gate being configured to:

combine the first power good signal generated by a given second hot swap module electrically connected to the second power input of a given load with the second power good signal generated by a given third hot swap module electrically connected to the third power input of the given load, and deliver the combined power good signal to the given load.

9. The circuit of claim 7, wherein:

each load is a server; and the first voltage, the second voltage, the third voltage and the second standby voltage comply with an ATX specification.

10. The circuit of claim 4, further comprising a controller operatively connected to the plurality of CRPSs and configured to:

monitor a power level provided by the plurality of CRPSs; and selectively activate and deactivate one or more of the plurality of CRPSs to maintain active all or a subset of the plurality of CRPSs sufficient to respond to power demands of the plurality of loads.

11. The circuit of claim 4, wherein a number of the plurality of loads is greater than a number of the plurality of CRPSs.

12. The circuit of claim 11, wherein the number of the plurality of loads is selected as a function of the number of the plurality of CRPSs for power supply redundancy.

13. The circuit of claim 5, wherein:

the plurality of loads comprises a first subset of loads of a first type and a second subset of loads of a second type;

power is selectively delivered to the loads of the first subset at the first voltage; and power is selectively delivered to the loads of the second subset at the second voltage.

* * * * *